(12) United States Patent
Lee et al.

(10) Patent No.: US 10,305,584 B2
(45) Date of Patent: May 28, 2019

(54) APPARATUS AND METHOD FOR PERFORMING BEAMFORMING OPERATION IN COMMUNICATION SYSTEM SUPPORTING FREQUENCY DIVISION-MULTIPLE INPUT MULTIPLE OUTPUT SCHEME

(71) Applicant: Samsung Electronics Co., Ltd., Suwon-si, Gyeonggi-do (KR)

(72) Inventors: Keon-Kook Lee, Suwon-si (KR); Ji-Ho Song, West Lafayette, IN (US); David J. Love, West Lafayette, IN (US); Tae-Young Kim, Seoul (KR); Ji-Yun Seol, Seongnam-si (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 96 days.

(21) Appl. No.: 15/298,795

(22) Filed: Oct. 20, 2016

(65) Prior Publication Data

US 2017/0111084 A1 Apr. 20, 2017

Related U.S. Application Data

(60) Provisional application No. 62/243,909, filed on Oct. 20, 2015.

(30) Foreign Application Priority Data

Dec. 3, 2015 (KR) .......................... 10-2015-0171333

(51) Int. Cl.
*H04B 1/713* (2011.01)
*H04B 7/26* (2006.01)
(Continued)

(52) U.S. Cl.
CPC .......... *H04B 7/2621* (2013.01); *H04L 27/26* (2013.01); *H04L 27/2634* (2013.01); *H04L 5/143* (2013.01)

(58) Field of Classification Search
CPC ............. H04W 72/0446; H04W 88/08; H04W 72/0453; H04W 24/00; H04L 5/0007
See application file for complete search history.

(56) References Cited

U.S. PATENT DOCUMENTS

| 7,529,311 B2* | 5/2009 | Shen ...................... H04B 7/024 370/464 |
| 8,149,791 B2* | 4/2012 | Li ........................ H04B 7/0434 370/252 |

(Continued)

OTHER PUBLICATIONS

3GPP TR 36.873 v12.0.0, "Study on 3D channel model for LTE," Technical Report 3GPP, Sep. 2014.

(Continued)

*Primary Examiner* — Gbemileke J Onamuti
*Assistant Examiner* — Sanjay K Dewan
(74) *Attorney, Agent, or Firm* — Jefferson IP Law, LLP

(57) ABSTRACT

A pre-5th-generation (5G) or 5G communication system for supporting higher data rates beyond 4th-generation (4G) communication system, such as a long term evolution (LTE), is provided. A method for performing a beamforming operation in a communication system supporting a frequency division-multiple input multiple output (FD-MIMO) scheme is provided. The method includes detecting a rough beam of a first dominant beam, detecting at least two codeword candidates based on the rough beam of the first dominant beam, and selecting one of the at least two codeword candidates as a final codeword.

20 Claims, 13 Drawing Sheets

(51) Int. Cl.
*H04L 5/14* (2006.01)
*H04L 27/26* (2006.01)

(56) References Cited

U.S. PATENT DOCUMENTS

| | | | | |
|---|---|---|---|---|
| 9,680,538 B2* | 6/2017 | Xia | | H04B 7/0617 |
| 9,778,557 B2* | 10/2017 | Eldar | | G03B 42/06 |
| 9,787,387 B2* | 10/2017 | Moon | | H04B 7/0617 |
| 2007/0298742 A1* | 12/2007 | Ketchum | | H04B 7/0617 |
| | | | | 455/186.1 |
| 2010/0103900 A1* | 4/2010 | Yeh | | H04B 7/0695 |
| | | | | 370/330 |
| 2012/0177385 A1* | 7/2012 | Guha | | H04B 10/1121 |
| | | | | 398/202 |
| 2014/0177749 A1* | 6/2014 | Wu | | H04L 25/03923 |
| | | | | 375/267 |
| 2014/0301492 A1* | 10/2014 | Xin | | H04B 7/0456 |
| | | | | 375/267 |
| 2015/0043439 A1* | 2/2015 | Sajadieh | | H04W 76/14 |
| | | | | 370/329 |
| 2015/0215014 A1* | 7/2015 | Zhu | | H04L 25/0248 |
| | | | | 375/267 |
| 2016/0080052 A1* | 3/2016 | Li | | H04B 7/0456 |
| | | | | 375/267 |
| 2016/0094280 A1* | 3/2016 | Zhu | | H04B 7/0417 |
| | | | | 375/267 |
| 2016/0365910 A1* | 12/2016 | Li | | H04B 7/0434 |
| 2017/0094531 A1* | 3/2017 | Kakishima | | H04B 7/0617 |
| 2017/0104517 A1* | 4/2017 | Kakishima | | H04B 7/0456 |
| 2018/0062722 A1* | 3/2018 | Su | | H04B 7/0617 |

OTHER PUBLICATIONS

Junil Choi et al., "Advanced limited feedback designs for FD-MIMO using uniform planar arrays", Proc. IEEE Global communications conference (GLOBECOM), Dec. 2015.

Jiho Song et al., "Kronecker-Product Mono and Dual Codebook Designs for FD-MIMO Systems".

* cited by examiner

ApparatUS AND METHOD FOR
PERFORMING BEAMFORMING
OPERATION IN COMMUNICATION
SYSTEM SUPPORTING FREQUENCY
DIVISION-MULTIPLE INPUT MULTIPLE
OUTPUT SCHEME

CROSS-REFERENCE TO RELATED
APPLICATION(S)

This application claims the benefit under 35 U.S.C. § 119(e) of a U.S. Provisional application filed on Oct. 20, 2015 in the U.S. Patent and Trademark Office and assigned Ser. No. 62/243,909, and under 35 U.S.C. § 119(a) of a Korean patent application filed on Dec. 3, 2015 in the Korean Intellectual Property Office and assigned Serial number 10-2015-0171333, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Purdue Research Foundation.

TECHNICAL FIELD

The present disclosure relates to an apparatus and method for performing a beamforming operation in a communication system supporting a frequency division-multiple input multiple output (FD-MIMO) scheme. More particularly, the present disclosure relates to an apparatus and method for performing a beamforming operation based on a Kronecker-product mono codebook and a Kronecker-product dual codebook in a communication system supporting an FD-MIMO scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

Various schemes for increasing system throughput have been proposed, and a typical one is a MIMO scheme using a plurality of antennas. In the MIMO scheme, it is essential for a transmitter to acquire accurate channel state information (CSI) in order to use signal processing techniques which enable high data rate transmission.

In cellular systems supporting a frequency division duplexing (FDD) scheme, CSI estimated in a receiver is transmitted to a transmitter through a feedback link.

In a massive MIMO scheme including a plurality of antennas, there is a need for a plurality of feedback bits for accurately quantizing CSI.

Here, a normalized beamforming gain using a random vector quantization (RVQ) codebook may be expressed in Equation 1.

$$G \triangleq E\left[\left|\frac{h^H}{\|h\|_2}c\right|^2\right] \approx 1 - 2^{-\frac{B}{M-1}} \quad \text{Equation 1}$$

In Equation 1, $h \in \mathbb{C}^M$ denotes a multiple input single output (MISO) channel vector, $C \in \mathbb{C}^M$ denotes a unit norm beamforming codeword, B denotes the number of feedback bits for an RVQ codebook, and M denotes the number of antennas.

A feedback overhead according to the number of general massive MIMO antennas will be described with reference to FIG. 1.

FIG. 1 schematically illustrates a feedback overhead according to the number of general massive MIMO antennas according to the related art.

Referring to FIG. 1, a vertical axis indicates the number of transmission (Tx) antennas, and a horizontal axis indicates the number of bits required for feedback. It will be noted that curves indicating feedback overheads according to the number of massive MIMO antennas in FIG. 1 are curves indicating feedback overheads according to the number of massive MIMO antennas in a case that target gains are 0.5, 0.6, 0.7, and 0.8. Here, a target gain is $G_{target}$.

As shown in FIG. 1, it will be understood that a feedback overhead increases proportional to the number of antennas. This massive feedback overhead acts as significant load to feedback links.

So, there is a need for a scheme of performing a beamforming operation thereby decreasing feedback overhead in a communication system supporting an FD-MIMO scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for performing a beamforming operation in a communication system supporting a frequency division-multiple input multiple output (FD-MIMO) scheme.

Another aspect of the present disclosure is to provide an apparatus and method for performing a beamforming operation based on a Kronecker-product mono codebook and a Kronecker-product dual codebook in a communication system supporting an FD-MIMO scheme.

Another aspect of the present disclosure is to provide an apparatus and method for performing a beamforming operation based on a channel characteristic in a communication system supporting an FD-MIMO scheme.

Another aspect of the present disclosure is to provide an apparatus and method for performing a beamforming operation based on an antenna structure in a communication system supporting an FD-MIMO scheme.

Another aspect of the present disclosure is to provide an apparatus and method for performing a beamforming operation thereby decreasing feedback overhead in a communication system supporting an FD-MIMO scheme.

In accordance with an aspect of the present disclosure, a method for performing a beamforming operation in a communication system supporting a FD-MIMO scheme is provided. The method includes detecting a rough beam of a first dominant beam, detecting at least two codeword candidates based on the rough beam of the first dominant beam, and selecting one of the at least two codeword candidates as a final codeword.

In accordance with another aspect of the present disclosure, a method for performing a beamforming operation in a communication system supporting an FD-MIMO scheme is provided. The method includes detecting at least two beams for each of at least two wide resource blocks (RBs), detecting at least two codeword candidates for each of narrow RBs based on the detected at least two beams, and selecting one of the at least two codeword candidates as a final codeword.

In accordance with another aspect of the present disclosure, an apparatus for performing a beamforming operation in a communication system supporting an FD-MIMO scheme is provided. The apparatus includes a processor configured to perform an operation of detecting a rough beam of a first dominant beam, an operation of detecting at least two codeword candidates based on the rough beam of the first dominant beam, and an operation of selecting one of the at least two codeword candidates as a final codeword.

In accordance with another aspect of the present disclosure, an apparatus for performing a beamforming operation in a communication system supporting an FD-MIMO scheme is provided. The apparatus includes a processor configured to perform an operation of detecting at least two beams for each of at least two wide RBs, an operation of detecting at least two codeword candidates for each of narrow RBs based on the detected at least two beams, and an operation of selecting one of the at least two codeword candidates as a final codeword.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
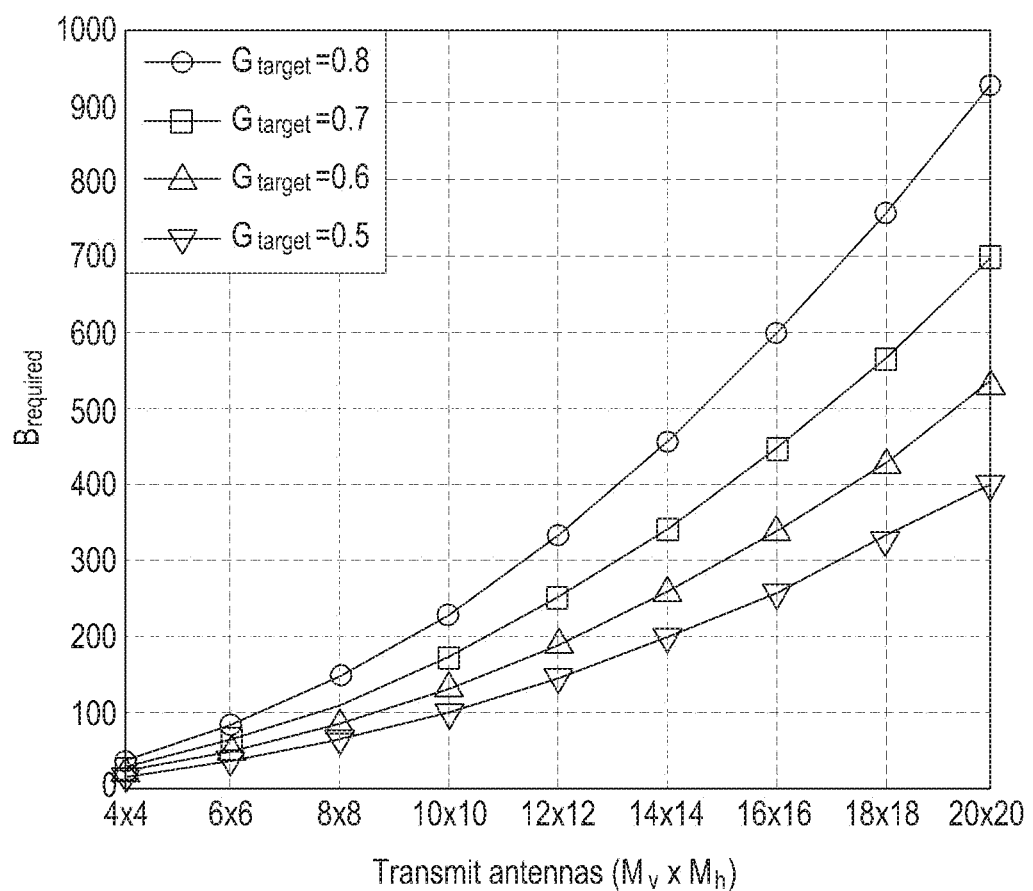
FIG. 1 schematically illustrates a feedback overhead according to the number of general massive multiple input multiple output (MIMO) antennas according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a signal transmitting apparatus or a signal receiving apparatus may be a user equipment (UE).

According to various embodiments of the present disclosure, for example, a signal transmitting apparatus or a signal receiving apparatus may be an evolved node B (eNB).

In various embodiments of the present disclosure, it will be noted that the term UE may be interchangeable with the term mobile station (MS), wireless terminal, mobile device, and/or the like.

In various embodiments of the present disclosure, it will be noted that the term eNB may be interchangeable with the term access point (AP), base station (BS), and/or the like.

An embodiment of the present disclosure proposes an apparatus and method for performing a beamforming operation in a communication system supporting a frequency division-multiple input multiple output (FD-MIMO) scheme.

An embodiment of the present disclosure proposes an apparatus and method for performing a beamforming operation based on a Kronecker-product mono codebook and a Kronecker-product dual codebook in a communication system supporting an FD-MIMO scheme.

An embodiment of the present disclosure proposes an apparatus and method for performing a beamforming operation based on a channel characteristic in a communication system supporting an FD-MIMO scheme.

An embodiment of the present disclosure proposes an apparatus and method for performing a beamforming operation based on an antenna structure in a communication system supporting an FD-MIMO scheme.

An embodiment of the present disclosure proposes an apparatus and method for performing a beamforming operation thereby decreasing feedback overhead in a communication system supporting an FD-MIMO scheme.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVB-H), an advanced TV systems committee-mobile/handheld (ATSC-M/H) service, and the like, and an internet protocol TV (IPTV), a MPEG media transport (MMT) system and/or the like.

A system model which is considered in a communication system supporting an FD-MIMO scheme according to an embodiment of the present disclosure will be described below.

An embodiment of the present disclosure considers a MIMO scheme using M transmission (Tx) antennas and N reception (Rx) antennas. A radio channel between each of the M Tx antennas and each of the N Rx antennas is defined by a channel vector $h \in \mathbb{C}^M$.

Meanwhile, in a cellular system supporting a frequency division duplexing (FDD) scheme, a receiver estimates a channel, quantizes the estimated channel to generate channel state information (CSI), and feeds back the generated CSI to a transmitter through a feedback link.

A system supporting a massive MIMO scheme needs to have a large-scale feedback overhead for exactly quantizing a channel. However, due to issues such as complexity for codeword search and feedback overhead, it is difficult to realize that the system supporting the massive MIMO scheme has a large-scale feedback overhead in a general cellular system.

So, there is a need for designing a codebook for a massive MIMO scheme using an antenna structure and a channel characteristic.

An antenna structure which is considered in a communication system supporting an FD-MIMO scheme according to an embodiment of the present disclosure will be described below.

Firstly, effect of an antenna structure will be described below.

Generally, a massive MIMO scheme uses a plurality of antennas, e.g., 100 or more than 100 antennas, so there is a need for arranging antennas thereby having space efficiency.

An embodiment of the present disclosure considers a unitary planar array (UPA) for arranging a plurality of antennas in a limited space.

Firstly, a UPA antenna structure where $M_v$ Tx antennas and $M_h$ antennas are arranged in a vertical area and a horizontal area, respectively, and $N_v$ Rx antennas and $N_h$ Rx antennas are arranged in a vertical area and a horizontal area, respectively will be considered. This will be described with reference to FIG. 2.

Figure 2:
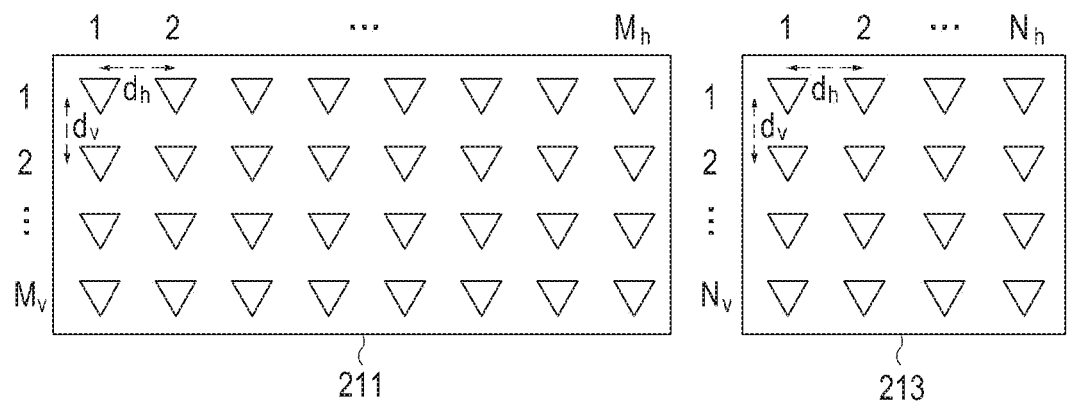
FIG. 2 schematically illustrates a unitary planar array (UPA) antenna structure in a communication system supporting a frequency division MIMO (FD-MIMO) scheme according to an embodiment of the present disclosure.

FIG. 2 schematically illustrates a UPA antenna structure in a communication system supporting an FD-MIMO scheme according to an embodiment of the present disclosure.

Referring to FIG. 2, in a UPA antenna structure in FIG. 2, $M_v$ Tx antennas and $M_h$ antennas are arranged in a vertical area and a horizontal area, respectively, and $N_v$ Rx antennas and $N_h$ Rx antennas are arranged in a vertical area and a horizontal area, respectively. If a UPA antenna structure in FIG. 2 is used, a transmitter 211 includes $M = M_v M_h$ Tx antennas, and a receiver 213 includes $N = N_v N_h$ Rx antennas. In FIG. 2, $d_v$ and $d_h$ denote a distance between antenna elements in a vertical line and a distance between antenna elements in a horizontal line, respectively.

Meanwhile, a ray-like beam with a UPA antenna structure may be defined as Equation 2 by a Kronecker-product of array response vectors.

$$d_{M_v M_h}\left(\frac{d_0 \sin \psi_v}{\lambda}, \frac{d_h \sin \psi_h}{\lambda}\right) \triangleq \qquad \text{Equation 2}$$
$$d_{M_v}\left(\frac{d_v \sin \psi_v}{\lambda}\right) \otimes d_{M_h}\left(\frac{d_h \sin \psi_h \cos \psi_v}{\lambda}\right) d_{M_a}(\Delta) \triangleq$$
$$[1, e^{j2\pi\Delta}, \ldots, e^{j2\pi(M_a-1)\Delta}]^T \in \mathbb{C}^{M_a}$$

In Equation 2, $\lambda$ denotes a wavelength, $\psi_v$ denotes angles of array response vectors in a vertical area, and $\psi_h$ denotes angles of array response vectors in a horizontal area.

Meanwhile, a Kronecker-product codebook may be a promising candidate indicating channels which occur in a UPA antenna structure. A set of discrete Fourier transform (DFT) vectors is suitable for quantizing ray-like beams which may be defined by array response vectors. So, an embodiment of the present disclosure considers Kronecker-product codebooks which use DFT vectors. Here, a DFT codebook of a size $2^{B_h}$ may be defined as Equation 3.

$$C_{ab} = \{d_{M_a}(2^{-Bb}), \ldots, d_{M_a}(2^{-Bb} 2^{Bb})\} \qquad \text{Equation 3}$$

A characteristic of a three dimensional (3D) spatial channel model (SCM) will be described below.

The 3D SCM may be expressed as Equation 4.

$$h = \sum_k a_k d_{M_v}\left(\frac{d_v \sin \psi_{vk}}{\lambda}\right) \otimes d_{M_h}\left(\frac{d_h \sin \psi_{hk} \cos \psi_{vk}}{\lambda}\right) \qquad \text{Equation 4}$$
$$\simeq \sum_{p=1}^{P} a_p c_{vp} \otimes c_{hp}^* \triangleq \tilde{h},$$

The 3D SCM in Equation 4 is a 3D SCM which is roughly calculated using the finite number of DFT beams. In Equation 4, $h \in \mathbb{C}^M$ denotes a block fading multiple input single output (MISO) channel vector, each of $$d_{M_v}\left(\frac{d_v \sin \psi_{vk}}{\lambda}\right) \text{ and } d_{M_h}\left(\frac{d_h \sin \psi_{hk} \cos \psi_{vk}}{\lambda}\right)$$

denotes an array response vector, $a_k$ denotes a complex channel gain of the kth ray-like beam, $a_p$ denotes a channel gain for the pth DFT beam, $c_{vp}$ denotes a DFT vector for the pth DFT beam in a vertical area, $c_{hp}$ denotes a DFT vector for the pth DFT beam in a horizontal area, P denotes the number of used DFT beams, and $h \in \mathbb{C}^M$ denotes a channel vector which is roughly calculated.

For evaluating an accuracy of the channel vector which is roughly calculated, a correlation coefficient will be defined as expressed in Equation 5.

$$X \doteq \left| \frac{h^H}{\|h\|_2} \frac{\tilde{h}}{\|\tilde{h}\|_2} \right|^2 \quad \text{Equation 5}$$

For example, the correlation coefficient in Equation 5 is detected from a numerical simulation by 5000 independent 3D SCM channel realizations.

An experimental cumulative distribution function (CDF) of a correlation coefficient in a communication system supporting an FD-MIMO scheme according to an embodiment of the present disclosure will be described with reference to FIG. 3.

Figure 3:
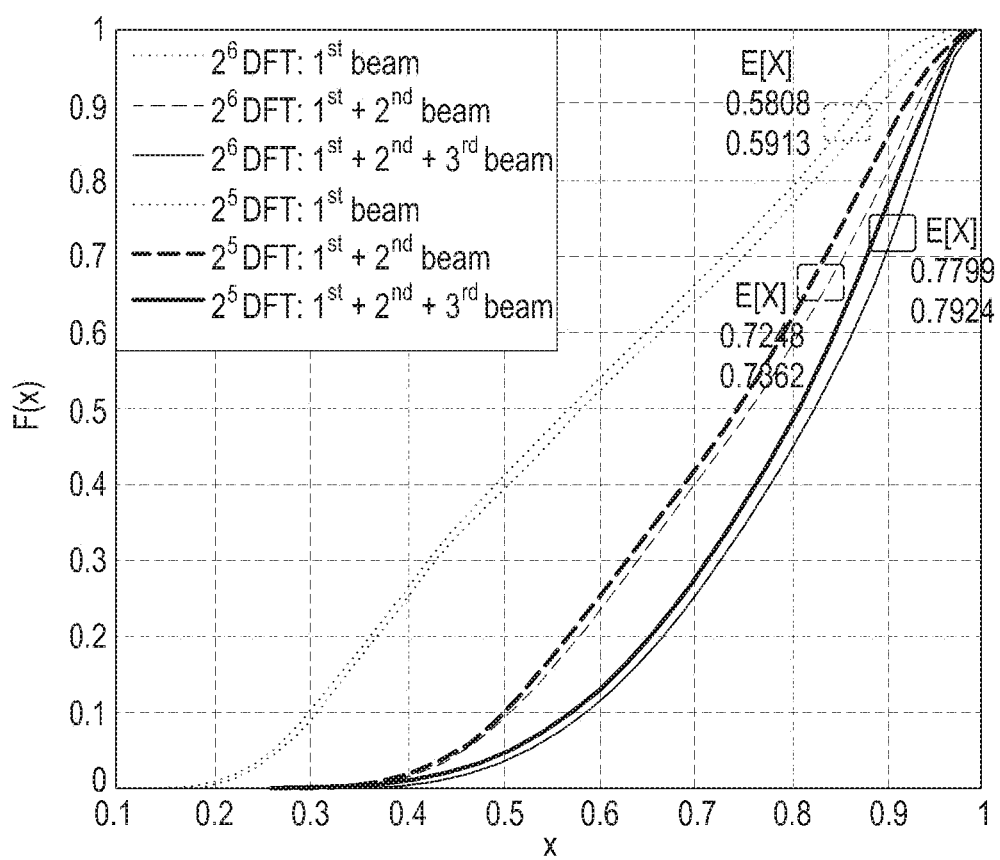
FIG. 3 schematically illustrates an experimental cumulative distribution function (CDF) of a correlation coefficient in a communication system supporting an FD-MIMO scheme according to an embodiment of the present disclosure.

FIG. 3 schematically illustrates an experimental CDF of a correlation coefficient in a communication system supporting an FD-MIMO scheme according to an embodiment of the present disclosure.

Referring to FIG. 3, simulation parameters used for detecting an experimental CDF of a correlation coefficient in FIG. 3 may be expressed in Table 1.

TABLE 1

8x8 copol UFA for Tx / 1x1 copol for Rx
$d_v = 0.8\lambda$, $d_h = 0.5\lambda$
UMi3D / NLOS
tx_beam_type = 'BF'
MS_drop_type='RANDOM'

In FIG. 3, P may be one of 1, 2, and 3, and B may be one of 5 and 6. In Table 1, P denotes the number of used DFT beams, and B denotes a size of a used DFT codebook.

In FIG. 3, a horizontal axis denotes a correlation coefficient X, and a vertical axis denotes F(X) as an experimental CDF of which an input is the correlation coefficient X. As shown in FIG. 3, it will be understood that roughly calculated channel vectors defined based on DFT codebooks of a size $2^5$ with one, two, and three DFT beams generate correlation coefficients which are equal to or greater than 0.425, 0.63, and 0.72 during time, e.g., 70% of channel realization. Here, roughly calculated channel vectors which are defined based on DFT codebooks of a size $2^6$ generate correlation coefficients which are equal to or greater than 0.43, 0.64, and 0.73 during 70% of time.

An expectation value of the correlation coefficient X may be expressed as Equation 6.

$$E\left[ \left| \frac{h^H}{\|h\|_2} \frac{\tilde{h}}{\|\tilde{h}\|_2} \right|^2 \right] \quad \text{Equation 6}$$

In a case of a scenario for a codebook of a size $2^5$, the expectation value of the correlation coefficient X in Equation 6 becomes 0.5808, 0.7248, and 0.7799 for roughly calculated channel vectors with one, two, and three DFT beams. In a case of a scenario for a codebook of a size $2^6$, the expectation value of the correlation coefficient X in Equation 6 becomes 0.5913, 0.7362, and 0.7924 for roughly calculated channel vectors with one, two, and three DFT beams.

As shown in FIG. 3, a combination of the finite number of DFT beams will be a promising solution indicating channel vectors. It will be notes that quantization performance may be enhanced if the more DFT beams are considered.

However, an embodiment of the present disclosure will consider two DFT beams by considering practical issues such as complexity for codeword search and a feedback overhead.

So, codebooks proposed in an embodiment of the present disclosure searches and combines two DFT beams for quantizing 3D SCM channels.

Firstly, a beam searching method for general Kronecker-product codebooks will be described below.

General Kronecker-product codebooks decompose a channel vector based on a singular value decomposition scheme. The decomposed channel vector may be expressed as Equation 7.

$$h = \sum_k \sigma_k u_k \otimes v_k^* \quad \text{Equation 7}$$

In Equation 7, $h \in \mathbb{C}^M$ a denotes a MISO channel vector, $u_k \in \mathbb{C}^{M_v}$ denotes the kth dominant left singular vector, $v_k \in \mathbb{C}^{M_h}$ denotes the kth dominant right singular vector, and $\sigma_k$ denotes the kth singular value.

In order to express h, each of general Kronecker-product codebooks quantizes the first dominant left singular vector in a vertical area, e.g., $u_1$ and the first dominant right singular vector in a horizontal area, e.g., $v_1$. A selected codeword may be expressed as Equation 8.

$$c_v = \underset{c \in C_{vb}}{\operatorname{argmax}} |u_1^H c|^2 \quad \text{Equation 8}$$

$$c_h = \underset{c \in C_{hb}}{\operatorname{argmax}} |v_1^H c|^2$$

In Equation 8, $C_{vb}$ denotes a DFT codebook of a size $2^{B_b}$ in a vertical direction, and $C_{hb}$ denotes a DFT codebook of a size $2^{B_b}$ in a horizontal direction. Then, DFT vectors are combined for generating a final codeword. The final codeword may be expressed as Equation 9.

$$c = c_v \otimes c_h^* \quad \text{Equation 9}$$

Firstly, general Kronecker-product codebooks do not directly quantize a channel. The Kronecker-product codebooks considers only the first dominant singular vector in a vertical area and the first dominant singular vector in a horizontal area. However, DFT beams will not be suitable for expressing the first dominant singular vectors, so it is not an effective solution for configuring a CSI to consider only the first dominant singular vectors. The second dominant DFT beams will not exist in the first dominant partial space which general codebooks search.

General Kronecker-product codebooks do not jointly search a vertical area and a horizontal area. That is, general Kronecker-product codebooks select a codeword in each of a vertical area and a horizontal area. A probability that a scheme of searching a codeword in each of a vertical area and a horizontal area, i.e., a scheme of searching a beam in each of the vertical area and the horizontal area is not an optimal solution is high.

A system supporting general Kronecker-product codebooks does not consider a phase alignment among a plurality of beams. For example, general Kronecker-product codebooks consider superposition between two beams as expressed in Equation 10.

$$c_{v1} = \underset{c \in C_{v1}}{\operatorname{argmax}} |u_1^H c|$$

$$c_{v2} = \underset{c \in C_{v2}}{\operatorname{argmax}} \left| u_1^H \frac{c_{v1} + c}{\|c_{v1} + c\|_2} \right|$$

Equation 10

In Equation 10, $c_{v1}$ denotes the first codeword candidate, and $c_{v2}$ denotes the second codeword candidate. As described above, a system supporting general Kronecker-product codebooks does not consider a phase alignment among a plurality of beams, so phases between two beams are not suitably ordered, and the two beams may be combined thereby decreasing performance thereof.

As described above, a beam searching method for general Kronecker-product codebooks may disrupt a preferable channel quantization. For quantizing a channel for a massive MIMO communication system, an embodiment of the present disclosure proposes new beam searching methods for Kronecker-product codebooks, e.g., a beam searching method for a Kronecker-product mono codebook and a beam searching method for a Kronecker-product dual codebook.

Firstly, a beam searching method for a Kronecker-product mono codebook will be described below.

A block fading channel of a single tone, i.e., a single frequency subcarrier channel will be considered in an embodiment of the present disclosure. As described for an antenna structure considered in a communication system supporting an FD-MIMO scheme according to an embodiment of the present disclosure, a channel vector h may be roughly calculated by a combination of two DFT beams.

So, a beam searching method proposed in an embodiment of the present disclosure selects two DFT beams by jointly searching a vertical area and a horizontal area, and combines the selected two DFT beams. For decreasing complexity for codeword search which may occur in a case that a beam is jointly searched, an embodiment of the present disclosure uses a hierarchical multi-round beam searching scheme, e.g., a hierarchical multi-round beam searching scheme including the first-round beam searching process, the second-round beam searching process, and a final codeword selecting process.

Firstly, the first round-beam searching process will be described below.

In the first round-beam searching process, a UE detects a rough beam direction of the first dominant DFT beam in a channel. The first dominant DFT beam $c_1$ may be expressed as Equation 11.

$$c_1 = c_{v1} \otimes c_{h1}^*,$$

$$(c_{v1}, c_{h1}) = \underset{c_v \in C_{v1}, c_h \in C_{h1}}{\operatorname{argmax}} |h^H(c_v \otimes c_h^*)|^2$$

Equation 11

As expressed in Equation 11, the first dominant DFT beam $c_1$ is a Kronecker-product of DFT vectors, i.e., $c_{v1}$ and $c_{h1}$. Here, $h \in \mathbb{C}^M$ is a block fading MISO channel vector. For convenience, a subcarrier index of a channel vector will be omitted herein.

In Equation 11, $c_{v1}$ and $c_{h1}$ are DFT codebooks of a size $2^{B_1}$ as defined in Equation 12.

$$C_{ab} = \{d_{M_a}(2^{-B_b}), \ldots, d_{M_a}(2^{-B_b} 2^{B_b})\}$$

Equation 12

It will be noted that a DFT beam $c_1$ selected in the first-round beam searching process will be used in the second-round beam searching process.

Secondly, the second round-beam searching process will be described below.

In the second round-beam searching process, a UE calculates two codeword candidates based on $c_1$. An embodiment of the present disclosure considers a scenario in which one dominant beam is considered, i.e., the first channel scenario and a scenario in which two dominant beams are considered, i.e., the second channel scenario in an SCM channel environment.

The first codeword candidate is calculated by considering the first channel scenario assuming one dominant beam in a channel. A rough beam direction of the first dominant beam $c_1$ may be modified by searching adjacent directions of the first dominant beam $c_1$. The first codeword candidate $c_I$ may be determined as expressed in Equation 13.

$$c_I = d_{M_v M_h}\left(\frac{\theta_{v1}}{2^{B_1}}, \frac{\theta_{h1}}{2^{B_1}}\right) \odot c_1$$

$$(\theta_{v1}, \theta_{h1}) = \underset{\theta_v, \theta_h \in Z_2}{\operatorname{argmax}} \left| h^H \left( d_{M_v M_h}\left(\frac{\theta_v}{2^{B_1}}, \frac{\theta_h}{2^{B_1}}\right) \odot c_1 \right) \right|^2$$

Equation 13

In Equation 13, $$d_{M_v M_h}\left(\frac{\theta_v}{2^{B_1}}, \frac{\theta_h}{2^{B_1}}\right) \doteq d_{M_v}\left(\frac{\theta_v}{2^{B_1}}\right) \otimes d_{M_h}\left(\frac{\theta_h}{2^{B_1}}\right)$$

denotes a Kronecker-product of array response vectors with shifting angles, e.g., $\theta_v$ and $\theta_h$ in a vertical area and a horizontal area, and $Z_2$ denotes a codebook of a size $2^{B_2}$ designed for modifying the first dominant beam.

The codebook $Z_2$ may be expressed as Equation 14.

$$Z_a = \{-\frac{1}{2} + 2^{-(B_a+1)}; 2^{-B_a}; \frac{1}{2} - 2^{-(B_a+1)}\}$$

Equation 14

Here, it will be noted that a Hadamard product formula using $$d_{M_v M_h}\left(\frac{\theta_v}{2^{B_1}}, \frac{\theta_h}{2^{B_1}}\right)$$

shifts beam directions of the first beam $c_1$ by $\theta_v$ and $\theta_h$ in a vertical area and a horizontal area, respectively.

The second codeword candidate is calculated by considering the second channel scenario assuming two dominant beams in a channel. In an embodiment of the present disclosure, a system supporting an FD-MIMO scheme detects the second dominant DFT beam, and jointly combines the second dominant DFT beam and the first dominant DFT beam $c_1$.

The second codeword candidate $c_{II}$ may be expressed as Equation 15.

$$c_{II} = \frac{c_1 + e^{j\theta}(c_{v2} \otimes c_{h2})}{\|c_1 + e^{j\theta}(c_{v2} \otimes c_{h2})\|^2},$$

$$(c_{v2}, c_{h2}, \theta) = \operatorname*{argmax}_{c_v \in C_{v3}, c_h \in C_{h3}, \theta \in Z} \left| h^H \left( \frac{c_1 + e^{j\theta}(c_v \otimes c_h)}{\|c_1 + e^{j\theta}(c_v \otimes c_h)\|_2} \right) \right|^2$$

Equation 15

In Equation 15, each of $c_{v3}$ and $c_{h3}$ denotes a DFT codebook of a size $2^{B_3}$, and z denotes a codebook of a size $2^{B_{ph}}$ for phase ordering between two beams. The codebook Z may be expressed as Equation 16.

$$Z = \left\{ 0, \frac{2\pi}{2^{B_{ph}}}, \cdots, \frac{2\pi}{2^{B_{ph}}}(2^{B_{ph}} - 1) \right\}$$

Equation 16

Here, it will be noted that relation between a feedback overhead for the first codebook candidate and a feedback overhead for the second codebook candidate is set as $2B_2=2B_3+B_{ph}$.

Thirdly, a final codeword selecting process will be described below.

A final codeword is selected as one of two codeword candidates, i.e., the first codeword candidate $c_I$ and the second codeword candidate $c_{II}$. The final codeword may be expressed as Equation 17

$$\hat{c} = c_{\hat{s}},$$

$$\hat{s} = \operatorname*{argmax}_{s \in \{I, II\}} |h^H c_s|^2$$

Equation 17

Secondly, a beam searching method for a Kronecker-product mono codebook for a plurality of Rx antennas will be described below.

Before describing the beam searching method for the Kronecker-product mono codebook for the plurality of Rx antennas, an embodiment of the present disclosure analyzes a channel characteristic of a MISO channel vector in each of Rx antennas.

In an embodiment of the present disclosure, correlation relation among MISO channel vectors in each of Rx antennas may be detected based on FIGS. 4 and 5, and this will be described below.

A snapshot of beam patterns in a communication system supporting an FD-MIMO scheme according to an embodiment of the present disclosure will be described with reference to FIG. 4.

Figure 4:
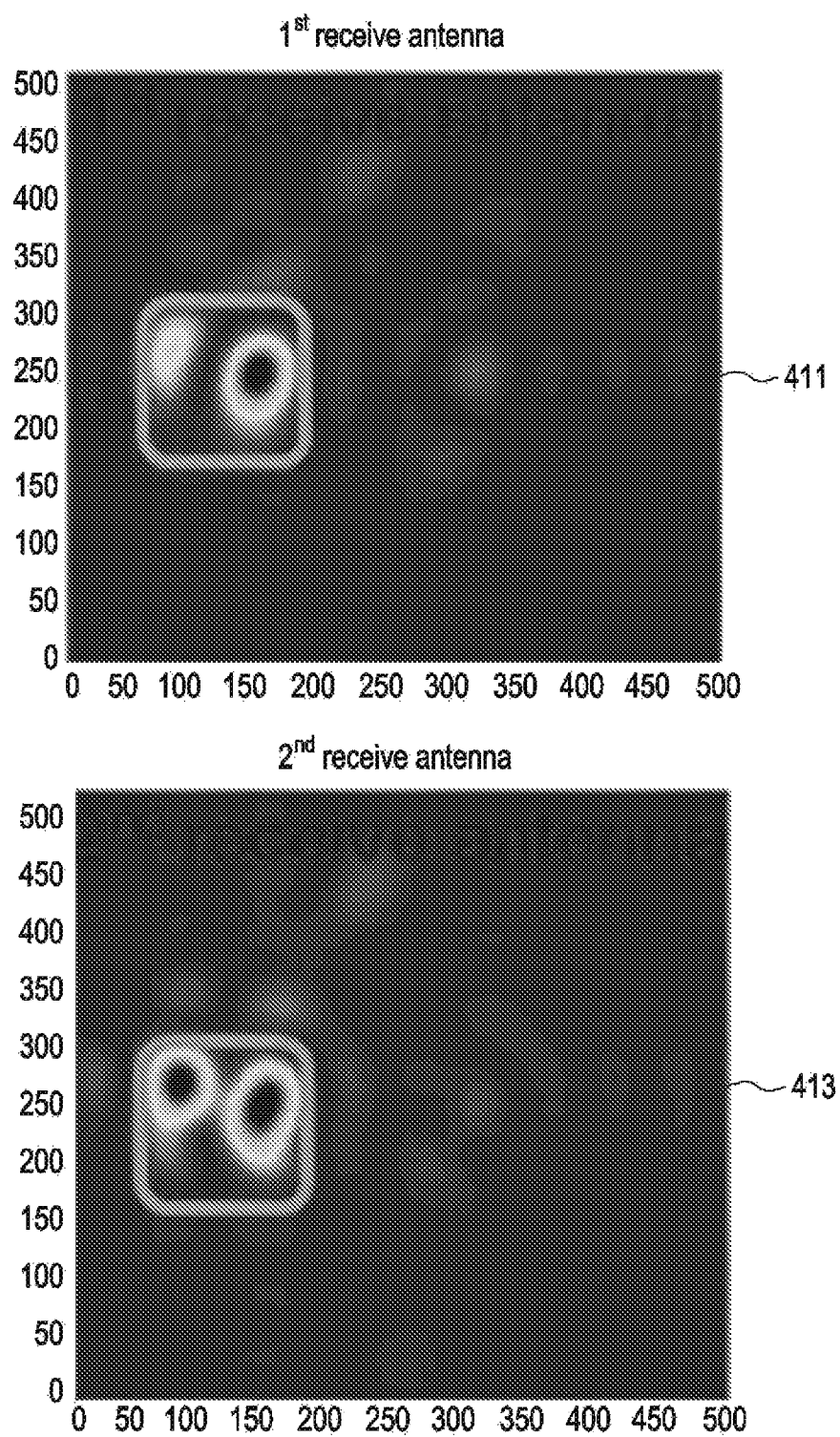
FIG. 4 schematically illustrates a snapshot of beam patterns in a communication system supporting an FD-MIMO scheme according to an embodiment of the present disclosure.

FIG. 4 schematically illustrates a snapshot of beam patterns in a communication system supporting an FD-MIMO scheme according to an embodiment of the present disclosure.

Referring to FIG. 4, it will be assumed that $M_v \times M_h$ (=10×10) Tx antennas and $N_v \times N_h$ (=2×1) Rx antennas are used in the communication system supporting the FD-MIMO scheme. A reference sign 411 indicates a snapshot for a beam pattern of the first Rx antenna among the $N_v \times N_h$ (=2×1) Rx antennas, and a reference sign 413 indicates a snapshot for a beam pattern of the second Rx antenna among the $N_v \times N_h$ (=2×1) Rx antennas.

A snapshot of beam patterns in a communication system supporting an FD-MIMO scheme according to an embodiment of the present disclosure has been described with reference to FIG. 4, and correlation relation among channels in each Rx antenna in a communication system supporting an FD-MIMO scheme according to an embodiment of the present disclosure will be described with reference to FIG. 5.

Figure 5:
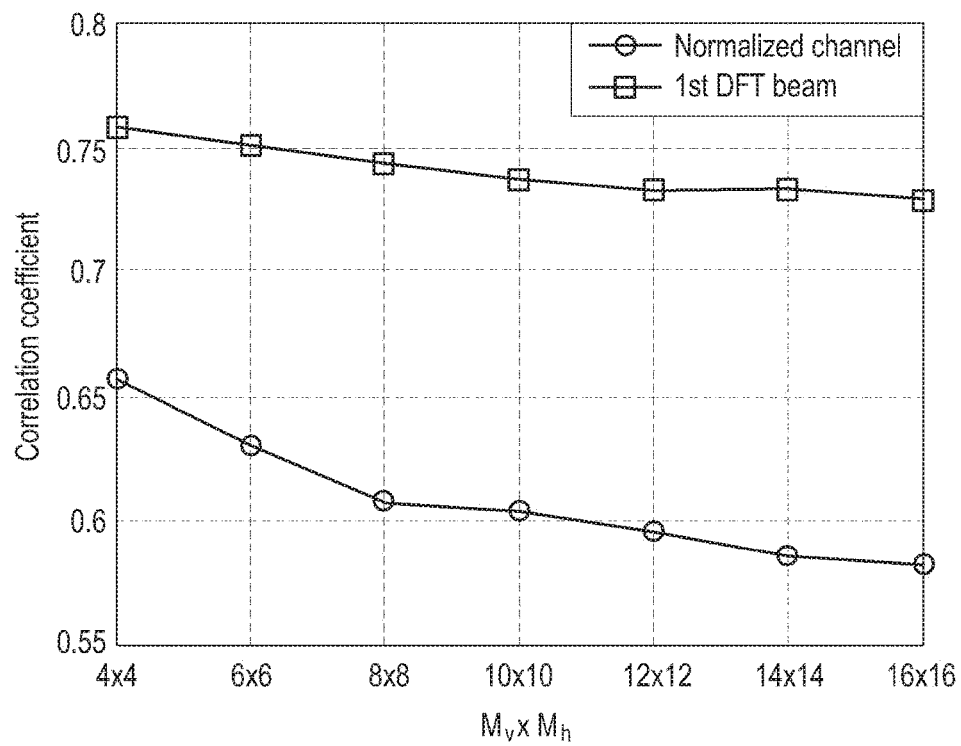
FIG. 5 schematically illustrates correlation relation among channels in each reception (Rx) antenna in a communication system supporting an FD-MIMO scheme according to an embodiment of the present disclosure.

FIG. 5 schematically illustrates correlation relation among channels in each Rx antenna in a communication system supporting an FD-MIMO scheme according to an embodiment of the present disclosure.

Referring to FIG. 5, it will be assumed that $M_v \times M_h$ (=10×10) Tx antennas and $N_v \times N_h$ (=2×1) Rx antennas are used in the communication system supporting the FD-MIMO scheme. In FIG. 5, a horizontal axis indicates the number of Tx antennas $M_v \times M_h$ and a vertical axis indicates a correlation coefficient.

As described in FIG. 5, it will be understood that a beam direction in each Rx antenna has high correlation relation, however, correlation relation among normalized channels is not high. A correlation channel characteristic enables codebooks supporting a plurality of Rx antennas to use a hierarchical multi-round beam searching scheme.

Meanwhile, in a MIMO system using a plurality of Rx antennas, an embodiment of the present disclosure needs to consider a combination at a receiver side.

Here, an optimization issue may be expressed as Equation 18.

$$(\hat{z}, \hat{c}) = \operatorname*{argmax}_{z \in \mathbb{C}^N, c \in \mathbb{C}^M} |z^H Hc|^2$$

Equation 18

In Equation 18, $\hat{z} \in \mathbb{C}^N$ denotes a selected combination codeword vector, $\hat{c} \in \mathbb{C}^M$ denotes a selected beamforming codeword vector, and $H=[h_1, \ldots, h_N]^H$ denotes a block fading MIMO channel matrix including N MISO channel vectors $h_n \in \mathbb{C}^M$, $n \in \{1, \ldots, N\}$.

In an embodiment of the present disclosure, a maximal ratio combiner $z=Hc/\|Hc\|_2$ is used for maximizing an effective signal to noise ratio (SNR). At this time, the optimization issue may be expressed as Equation 19.

$$\hat{c} = \operatorname*{argmax}_{c \in \mathbb{C}^M} \sum_{n=1}^{N} |h_n^H c|^2$$

Equation 19

Meanwhile, it will be noted that a combiner in a receiver may be defined as $\hat{z}=H\hat{c}/\|H\hat{c}\|_2$ using a selected beamforming codeword $\hat{c} \in \mathbb{C}^M$. Similarly, a beamforming codeword $\hat{c}$ is selected based on a Kronecker-product mono codebook as described in a beam searching method for a Kronecker-product mono codebook, except for a metric in a maximization issue.

Thirdly, a beam searching method for a Kronecker-product dual codebook will be described below.

An embodiment of the present disclosure proposes a Kronecker-product dual codebook supporting a plurality of tones, i.e., a plurality of subcarriers. Before describing the beam searching method for the Kronecker-product dual codebook, an embodiment of the present disclosure defines an entire range of a wide band.

A wide band including C tones are divided into L wide resource blocks (RBs) $H=[H_1, \ldots, H_L]$. Here, a wide RB may be expressed as Equation 20.

$$H_l = \left[h\left[1 + \frac{C(l-1)}{L}\right], \cdots, h\left[\frac{Cl}{L}\right]\right] \in \mathbb{C}^{M \times \frac{C}{L}} \quad \text{Equation 20}$$

In Equation 20, $H_l$ denotes the lth wide RB including C/L tones.

Each wide RB is divided into R narrow RBs $H_l = [H_l[1], \ldots, H_l[R]]$. Here, a narrow RB may be expressed as Equation 21.

$$H_l[r] = \left[h\left[1 + \frac{C(l-1)}{L} + \frac{L(r-1)}{R}\right],\right.$$
$$\left.\cdots, h\left[1 + \frac{C(l-1)}{L} + \frac{Lr}{R}\right]\right] \in \mathbb{C}^{M \times \frac{C}{LR}} \quad \text{Equation 21}$$

In Equation 21, $H_l[r]$ denotes the rth narrow RB including C/(LR) channel tones in the lth wide RB.

In an embodiment of the present disclosure, it will be assumed that each wide RB has a wide band precoding matrix indicator (PMI), and each narrow RB has a narrow band PMI.

A wide band in a communication system supporting an FD-MIMO scheme according to an embodiment of the present disclosure will be described with reference to FIG. 6.

Figure 6:
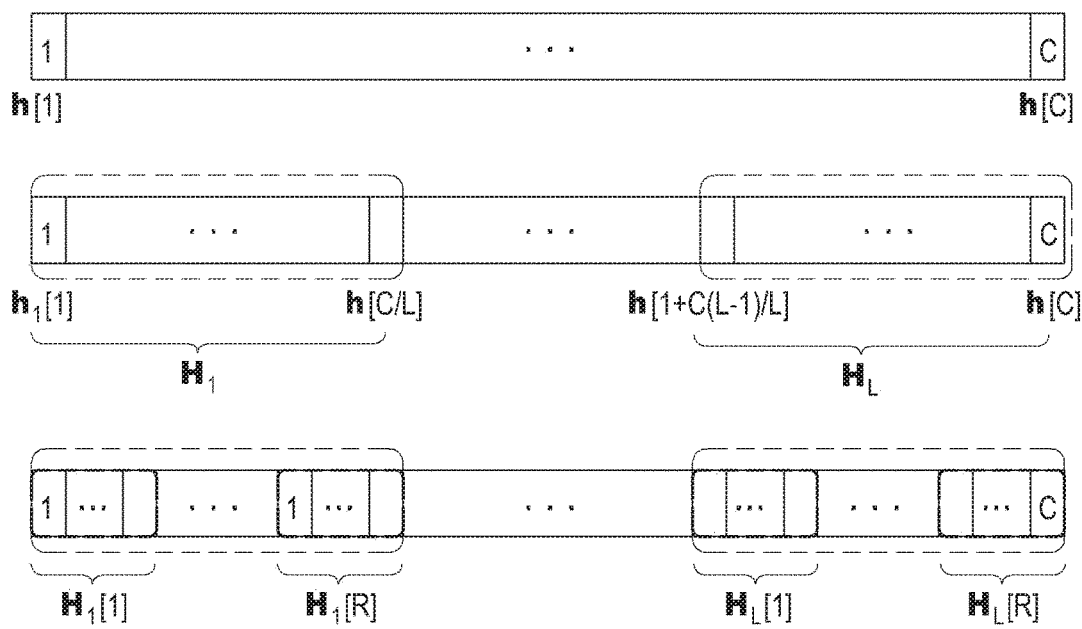
FIG. 6 schematically illustrates a wide band in a communication system supporting an FD-MIMO scheme according to an embodiment of the present disclosure.

FIG. 6 schematically illustrates a wide band in a communication system supporting an FD-MIMO scheme according to an embodiment of the present disclosure.

Referring to FIG. 6, a wide band including C tones includes L wide RBs $H = [H_1, \ldots, H_L]$, and each wide RB includes R narrow RBs $H_l = [H_l[1], \ldots, H_l[R]]$.

Meanwhile, an embodiment of the present disclosure considers a channel characteristic of a plurality of tones.

A snapshot of beam patterns of each tone in a communication system supporting an FD-MIMO scheme according to an embodiment of the present disclosure will be described with reference to FIG. 7.

Figure 7:
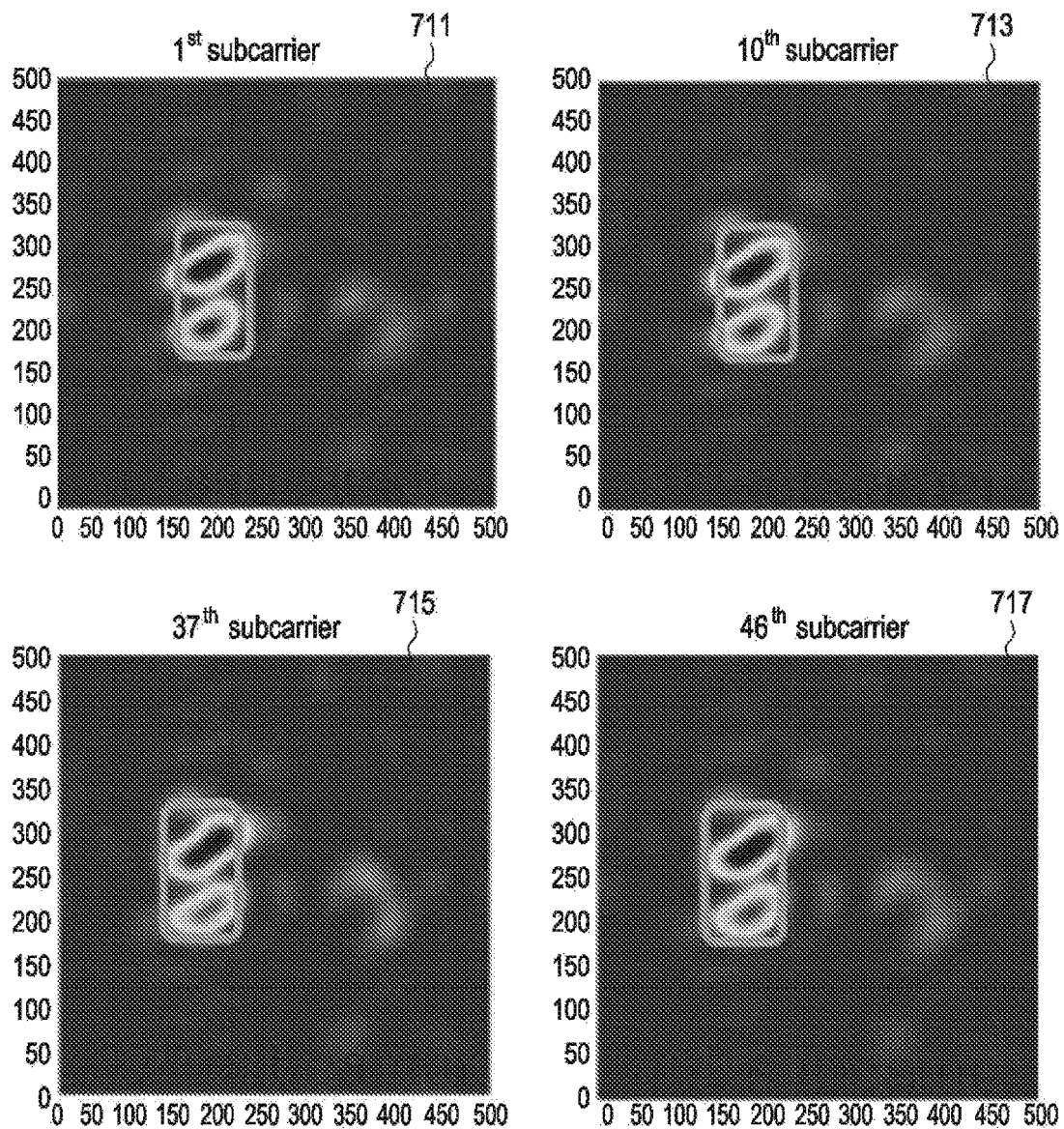
FIG. 7 schematically illustrates a snapshot of beam patterns of each tone in a communication system supporting an FD-MIMO scheme according to an embodiment of the present disclosure.

FIG. 7 schematically illustrates a snapshot of beam patterns of each tone in a communication system supporting an FD-MIMO scheme according to an embodiment of the present disclosure.

Referring to FIG. 7, it will be assumed that $M_v \times M_h$ (=10×10) Tx antennas and $N_v \times N_h$ (=2×1) Rx antennas are used in the communication system supporting the FD-MIMO scheme according to an embodiment of the present disclosure. A reference signal 711 indicates a snapshot for a beam pattern of the first subcarrier, a reference signal 713 indicates a snapshot for a beam pattern of the tenth subcarrier, a reference signal 715 indicates a snapshot for a beam pattern of the 37th subcarrier, and a reference signal 717 indicates a snapshot for a beam pattern of the 46th subcarrier.

As shown in FIG. 7, it will be understood that a beam direction in each subcarrier has high correlation relation.

A snapshot of beam patterns of each tone in a communication system supporting an FD-MIMO scheme according to an embodiment of the present disclosure has been described with reference to FIG. 7, and correlation relation among channels in each sub-channel in a communication system supporting an FD-MIMO scheme according to an embodiment of the present disclosure will be described with reference to FIG. 8.

Figure 8:
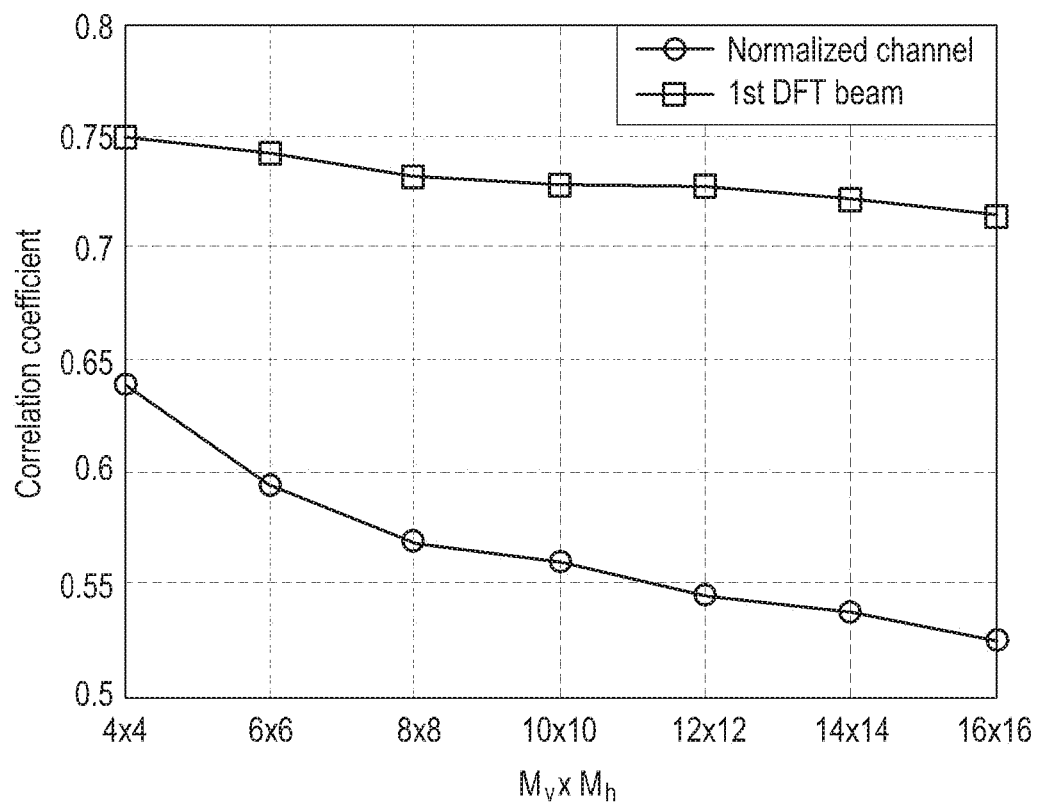
FIG. 8 schematically illustrates correlation relation among channels in each sub-channel in a communication system supporting an FD-MIMO scheme according to an embodiment of the present disclosure.

FIG. 8 schematically illustrates correlation relation among channels in each sub-channel in a communication system supporting an FD-MIMO scheme according to an embodiment of the present disclosure.

Referring to FIG. 8, it will be assumed that $M_v \times M_h$ (=10×10) Tx antennas and $N_v \times N_h$ (=2×1) Rx antennas are used, and the number of tones C is 300 (C=300). In FIG. 8, a horizontal axis indicates the number of Tx antennas $M_v \times M_h$ and a vertical axis indicates a correlation coefficient.

As shown in FIG. 8, it will be understood that DFT beam directions in each subcarrier have high correlation relation, however, correlation relation among normalized channels is not high.

So, an embodiment of the present disclosure proposes dual codebooks which share some correlation information such as rough beam directions for wide RBs for decreasing overall feedback overhead.

A beam searching method for a Kronecker-product dual codebook proposed in an embodiment of the present disclosure will be described below. The beam searching method for the Kronecker-product dual codebook includes a first-round beam searching process for wide RBs, a second-round beam searching process for narrow RBs, and a final codeword selecting process.

Firstly, the first-round beam searching process for the wide RBs will be described below.

In the first-round beam searching process for the wide RBs, a UE detects rough beam directions for wide RBs. Here, a communication system supporting an FD-MIMO scheme detects only two beams for each wide RB in the first-round beam searching process for the wide RBs by considering limited amount of feedback overhead.

The first dominant DFT beam $c_{W_1}[l]$ for the lth wide RB may be expressed as Equation 22.

$$c_{W1}[l] = c_{v1} \otimes c_{h1}^* \quad \text{Equation 22}$$
$$(c_{v1}, c_{h1}) = \underset{c_v \in C_{vW1}, c_h \in C_{hW1}}{\operatorname{argmax}} \sum_{m=1}^{C/L} |h^H[m + (l-1)C/L](c_v \otimes c_h^*)|^2$$
$$= \underset{c_v \in C_{vW1}, c_h \in C_{hW1}}{\operatorname{argmax}} \|H_l^H(c_v \otimes c_h^*)\|_2^2,$$

In Equation 22, $H_l$ denotes a channel matrix for the lth wide RB including C/L channel tones, and each of $C_{vW1}$ and $C_{hW1}$ denotes a DFT codebook of a size $2^{B_{W1}}$. Here, $C_{vW1}$ denotes a DFT codebook of a size $2^{B_{W1}}$ in a vertical area, and $C_{hW1}$ denotes a DFT codebook of a size $2^{B_{W1}}$ in a horizontal area.

The second dominant DFT beam $c_{W_2}[l]$ for the lth wide RB may be expressed as Equation 23.

$$c_{W2}[l] = c_{v2} \otimes c_{h2}^* \quad \text{Equation 23}$$
$$(c_{v2}, c_{h2}, \tilde{\theta}) =$$
$$\underset{c_v \in C_{vW2}, c_h \in C_{hW2}, \theta \in Z}{\operatorname{argmax}} \left\| H_l^H \left( \frac{c_{W1}[l] + e^{j\theta}(c_v \otimes c_h^*)}{\|c_{W1}[l] + e^{j\theta}(c_v \otimes c_h^*)\|_2} \right) \right\|_2^2$$

In Equation 23, each of $C_{vW2}$ and $C_{hW2}$ denotes a DFT codebook of a size $2^{B_{W2}}$. Here, $C_{vW2}$ denotes a DFT codebook of a size $2^{B_{W2}}$ in a vertical area, and $C_{hW2}$ denotes a DFT codebook of a size $2^{B_{W2}}$ in a horizontal area. Here, selected two beams will be shared among narrow RBs in the next process, i.e., the second-round beam searching process for narrow RBs. It will be noted that a set of two rough beams for wide RBs may be regarded as a wide band PMI.

Secondly, the second-round beam searching process for narrow RBs will be described below.

In the second-round beam searching process for the narrow RBs, a UE calculates two codeword candidates for each narrow RB based on $c_{W1}[l]$ and $c_{W2}[l]$ detected for wide RBs.

An embodiment of the present disclosure will consider two scenarios, i.e., a scenario in which one dominant beam is used and a scenario in which two dominant beams are used in an SCM channel environment.

The first codeword candidate is calculated by considering a scenario in which one dominant beam is used. Here, the first beam $c_{W1}[l]$ defined for wide RBs may be expressed as Equation 24.

$$c_{I,I}[r] = d_{M_v M_h}\left(\frac{\theta_{v1}}{2^{B_{W1}}}, \frac{\theta_{h1}}{2^{B_{W1}}}\right) \odot c_{W1}[l] \quad \text{Equation 24}$$

$$(\theta_{v1}, \theta_{h1}) = \operatorname*{argmax}_{\theta_v, \theta_h \in \mathcal{Z}_{N_1}} \| H_l^H[r] \left( d_{M_v M_h}\left(\frac{\theta_v}{2^{B_{W1}}}, \frac{\theta_h}{2^{B_{W1}}}\right) \odot c_{W1}[l] \right) \|_2^2$$

In Equation 24, $H_l[r] \in \mathbb{C}^{M \times C/LR}$ denoees a channel matrix for the rth narrow RB in the lth wide RB, and $\mathcal{Z}_{N_1}$ denotes a codebook of a size $2^{B_{N_1}}$ designed for modifying the first beam. The codebook of the size $2^{B_{N_1}}$ may be expressed as Equation 25.

$$\mathcal{Z}_a = \{-\tfrac{1}{2} + 2^{-(B_a+1)}; 2^{-B_a}; \tfrac{1}{2} + 2^{-(B_a+1)}\} \quad \text{Equation 25}$$

The second codeword candidate is calculated by considering a scenario in which two dominant beams are used. The first beam $c_{W1}[l]$ is modified, and the modified first beam is jointly combined with the second beam $c_{W2}[l]$. The second codeword candidate may be expressed as Equation 26.

$$c_{I,II}[r] = \frac{d_{M_v M_h}\left(\frac{\theta_{v2}}{2^{B_{W1}}}, \frac{\theta_{h2}}{2^{B_{W1}}}\right) \odot c_{W1}[l] + e^{j\theta} c_{W2}[l]}{\| d_{M_v M_h}\left(\frac{\theta_{v2}}{2^{B_{W1}}}, \frac{\theta_{h2}}{2^{B_{W1}}}\right) \odot c_{W1}[l] + e^{j\theta} c_{W2}[l] \|_2} \quad \text{Equation 26}$$

$$(\theta_{v2}, \theta_{h2}, \theta) = \operatorname*{argmax}_{\theta_v, \theta_h \in \mathcal{Z}_{N_2}, \theta \in \mathcal{Z}} \| H_l^H[r] \left( \frac{d_{M_v M_h}\left(\frac{\theta_{v2}}{2^{B_{W1}}}, \frac{\theta_{h2}}{2^{B_{W1}}}\right) \odot c_{W1}[l] + e^{j\theta} c_{W2}[l]}{\| d_{M_v M_h}\left(\frac{\theta_{v2}}{2^{B_{W1}}}, \frac{\theta_{h2}}{2^{B_{W1}}}\right) \odot c_{W1}[l] + e^{j\theta} c_{W2}[l] \|_2} \right) \|_2^2$$

In Equation 26, $\mathcal{Z}$ denotes a codebook of a size $2^{B_{pa}}$ designed for ordering phases two beams. The codebook of the size $2^{B_{ph}}$ $\mathcal{Z}$ may be expressed as Equation 27.

$$\mathcal{Z} = \left\{ 0, \frac{2\pi}{2^{B_{ph}}}, \cdots, \frac{2\pi}{2^{B_{ph}}}(2^{B_{ph}} - 1) \right\} \quad \text{Equation 27}$$

It will be noted that relation among feedback codewords for the first codeword candidate and the second codeword candidate is set as $2^{B_{N1}} = 2^{B_{N2}} + 2^{B_{ph}}$.

Thirdly, the final codeword selecting process will be described below.

A final codeword is selected one of two codeword candidates, i.e., the first codeword candidate $c_{I,I}[r]$ and the second codeword candidate $c_{I,II}[r]$. A final codeword for each narrow RB may be expressed as Equation 28.

$$\hat{c}_l[r] = c_{l,\hat{s}}[r] \quad \text{Equation 28}$$

$$\hat{s} = \operatorname*{argmax}_{s \in \{I, II\}} \| H_l^H[r] c_{l,s}[r] \|_2^2, \, l \in \{1, \cdots, L\}, \, r \in \{1, \cdots, R\}$$

Performance for a beamforming operation which is based on a Kronecker-product mono codebook and a Kronecker-product dual codebook in a communication system supporting an FD-MIMO scheme according to an embodiment of the present disclosure will be described below.

Performance of a Kronecker-product mono codebook for one tone according to an embodiment of the present disclosure will be described below.

An embodiment of the present disclosure considers a performance metric as expressed in Equation 29, i.e., a normalized beamforming gain.

$$G \doteq E\left[ \left| \frac{\hat{z}H}{\| \hat{z}H \|_2} \hat{c} \right|^2 \right] \quad \text{Equation 29}$$

In Equation 29, $\hat{z} \in \mathbb{C}^N$ denotes a selected combination beamforming codeword vector, $\hat{c} \in \mathbb{C}^M$ denotes a selected beamforming codeword vector, and $H \in \mathbb{C}^{N \times M}$ denotes a block fading MIMO channel matrix.

If a MISO scheme is used, a normalized beamforming gain may be expressed as Equation 30.

$$G \doteq E\left[ \left| \frac{h^H}{\| h \|_2} \hat{c} \right|^2 \right] \quad \text{Equation 30}$$

In Equation 30, $h \in \mathbb{C}^M$ denotes a block fading MISO channel vector.

Meanwhile, numerical results may be averaged from a Monte Carlo simulation by 3000 independent 3D SCM channel realizations.

3D SCM simulation parameters as described in Table 1 are used for the Monte Carlo simulation, except for the number of Tx antennas which is changed from 4×4(=16) to 20×20(=400), and the number of Tx antennas which is changed from 1×1(=1) to 2×2(=4).

Further, feedback overhead schemes for Kronecker-product mono codebooks proposed in an embodiment of the present disclosure may be expressed as Table 2.

Firstly, it will be noted that final feedback overhead schemes are a combination of the first-round beam searching process included in a beam searching method for a Kronecker-product mono codebook, the second-round beam searching process included in the beam searching method for the Kronecker-product mono codebook, and a final codeword selecting process included in the beam searching method for the Kronecker-product mono codebook.

TABLE 2

| Scheme | 1st round | 2nd round | Final | Feedback overhead |
|---|---|---|---|---|
| M-i | $B_1 = 5$ | $B_2 = 6$, ($B_3 = 5$, $B_{ph} = 2$) | $B_{sel} = 1$ | $B_{tot} = 2B_1 + 2B_2 + B_{sel}$ |
| M-ii |  | $B_2 = 5$, ($B_3 = 4$, $B_{ph} = 2$) |  |  |
| M-iii |  | $B_2 = 4$, ($B_3 = 3$, $B_{ph} = 2$) |  |  |

As shown in Table 2, it will be understood that a feedback overhead of a beam searching method for a Kronecker-product mono codebook is a combination of a feedback overhead of the first-round beam searching process included in the beam searching method for the Kronecker-product mono codebook, a feedback overhead of the second-round beam searching process included in the beam searching method for the Kronecker-product mono codebook, and a feedback overhead of a final codeword selecting process included in the beam searching method for the Kronecker-product mono codebook.

An example of a normalized beamforming gain for a Kronecker-product mono codebook in a case that an MISO scheme is used in a communication system according to an embodiment of the present disclosure will be described with reference to FIG. 9.

Figure 9:
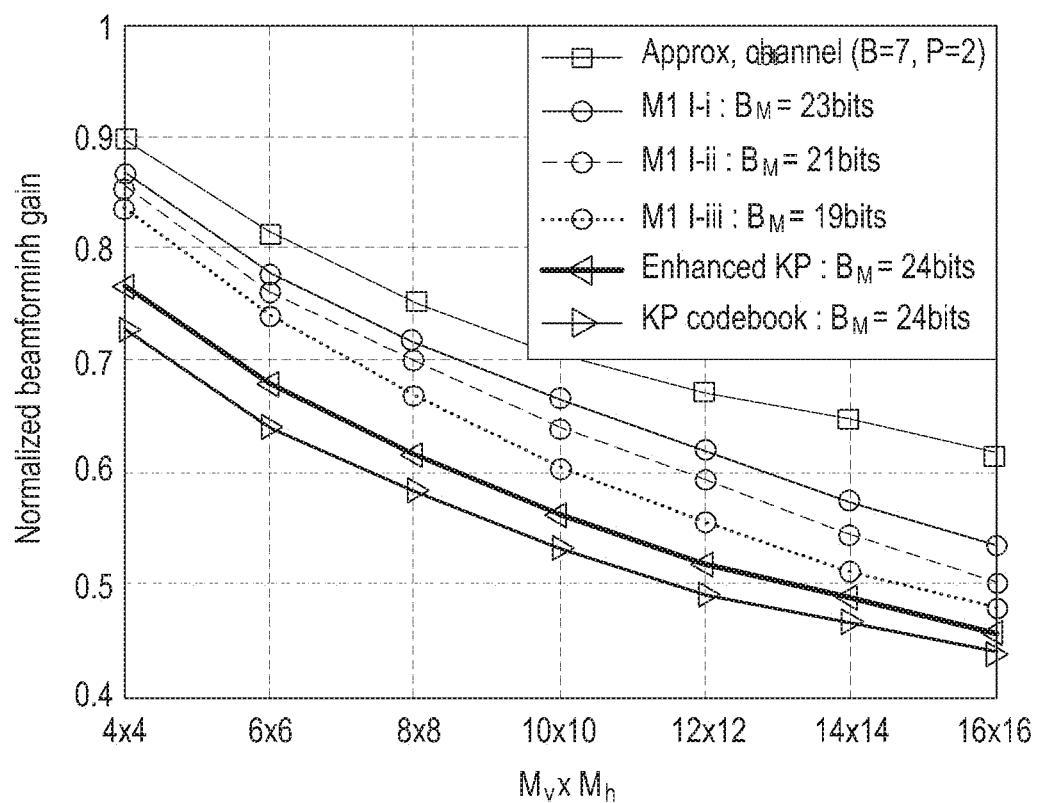
FIG. 9 schematically illustrates an example of a normalized beamforming gain for a Kronecker-product mono codebook in a case that a multiple input single output (MISO) scheme is used in a communication system according to an embodiment of the present disclosure.

FIG. 9 schematically illustrates an example of a normalized beamforming gain for a Kronecker-product mono codebook in a case that an MISO scheme is used in a communication system according to an embodiment of the present disclosure.

Referring to FIG. 9, each of graphs shown as "M-i: $B_M$=23 bits", "M-ii: $B_M$=21 bits", and "M-iii: $B_M$=19 bits" indicates a normalized beamforming gain of a Kronecker-product mono codebook proposed in an embodiment of the present disclosure, a graph shown as "Enhanced KP: $B_M$=24 bits" indicates a normalized beamforming gain of a Kronecker-product codebook that considers only the first dominant singular vector in a vertical area and the first dominant singular vector in a horizontal area, and quantizes two beams which exist in a channel, and a graph shown as "KP codebook: $B_M$=24 bits" indicates a normalized beamforming gain of a general Kronecker-product codebook. For convenience, a Kronecker-product codebook that considers only the first dominant singular vector in a vertical area and the first dominant singular vector in a horizontal area, and quantizes two beams which exist in a channel will be referred to as enhanced Kronecker-product codebook.

Meanwhile, a codebook proposed in an embodiment of the present disclosure directly quantizes a channel while jointly searching a vertical area and a horizontal area. However, an enhanced Kronecker-product codebook and a general Kronecker-product codebook consider only the first dominant singular vector in a vertical area and the first dominant singular vector in a horizontal area.

The general Kronecker-product codebook quantizes only one beam which exists in a channel, and the enhanced Kronecker-product codebook quantizes two beams. However, the general Kronecker-product codebook and the enhanced Kronecker-product codebook do not consider phase alignment among a plurality of beams, so phases of two beams are not suitably ordered, and the two beams may be combined thereby decreasing performance. In a codebook proposed in an embodiment of the present disclosure, two beams may be combined based on a scheme of ordering phases.

Performance graphs in FIG. 9 indicate performance graphs in a case that $d_v$=0.8λ, $d_h$=0.5λ, and an MISO scheme is used in the communication system.

In FIG. 9, a vertical axis indicates a normalized beamforming gain, and a horizontal axis indicates the number of Tx antennas.

As shown in FIG. 9, it will be understood that normalized beamforming gains of Kronecker-product mono codebooks proposed in an embodiment of the present disclosure are better than a normalized beamforming gain of a general Kronecker-product codebook and a normalized beamforming gain of an enhanced Kronecker-product codebook.

As shown in FIG. 9, it will be understood that overall feedback overhead for Kronecker-product mono codebooks proposed in an embodiment of the present disclosure is less than overall feedback overhead for a general Kronecker-product codebook and overall feedback overhead for an enhanced Kronecker-product codebook.

An example of a normalized beamforming gain for a Kronecker-product mono codebook in a case that an MISO scheme is used in a communication system according to an embodiment of the present disclosure has been described with reference to FIG. 9, and another example of a normalized beamforming gain for a Kronecker-product mono codebook in a case that an MISO scheme is used in a communication system according to an embodiment of the present disclosure will be described with reference to FIG. 10.

Figure 10:
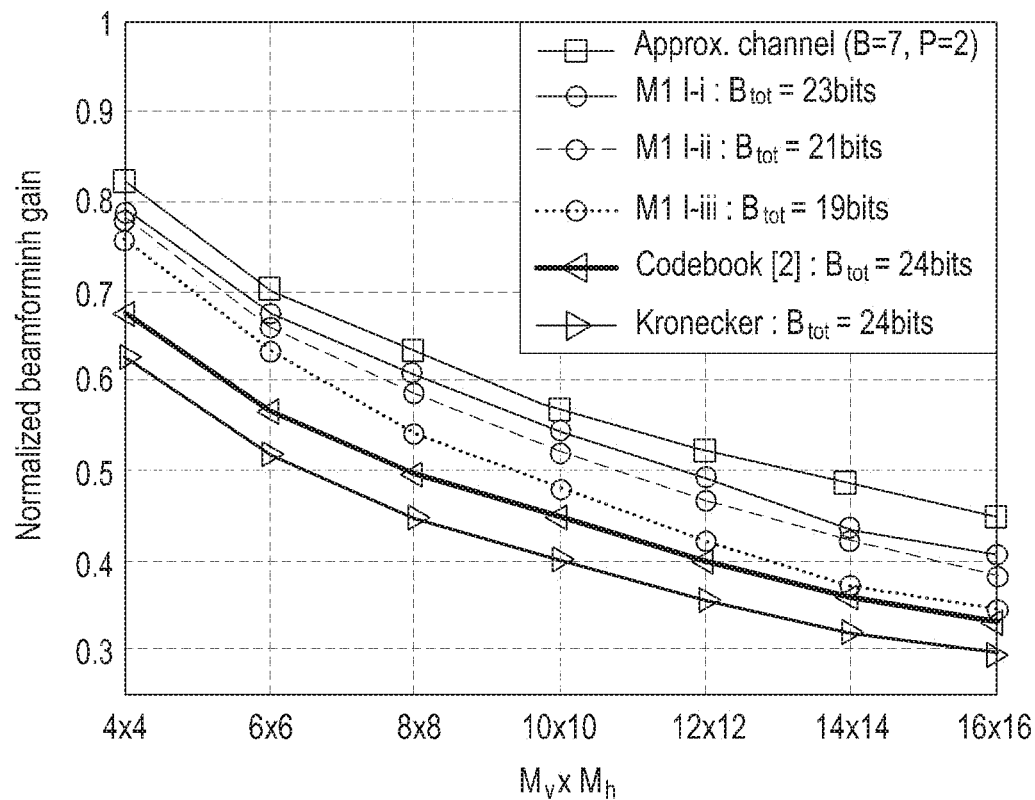
FIG. 10 schematically illustrates another example of a normalized beamforming gain for a Kronecker-product mono codebook in a case that an MISO scheme is used in a communication system according to an embodiment of the present disclosure.

FIG. 10 schematically illustrates another example of a normalized beamforming gain for a Kronecker-product mono codebook in a case that an MISO scheme is used in a communication system according to an embodiment of the present disclosure.

Referring to FIG. 10, each of graphs shown as "M-i: $B_M$=23 bits", "M-ii: $B_M$=21 bits", and "M-iii: $B_M$=19 bits" indicates a normalized beamforming gain of a Kronecker-product mono codebook proposed in an embodiment of the present disclosure, a graph shown as "Enhanced KP: $B_M$=24 bits" indicates a normalized beamforming gain of an enhanced Kronecker-product codebook, and a graph shown as "KP codebook: $B_M$=24 bits" indicates a normalized beamforming gain of a general Kronecker-product codebook.

Performance graphs in FIG. 10 indicate performance graphs in a case that $d_V$=1.62, $d_h$=1.02, and an MISO scheme is used in the communication system.

In FIG. 10, a vertical axis indicates a normalized beamforming gain, and a horizontal axis indicates the number of Tx antennas.

As shown in FIG. 10, it will be understood that normalized beamforming gains of Kronecker-product mono codebooks proposed in an embodiment of the present disclosure are better than a normalized beamforming gain of a general Kronecker-product codebook and a normalized beamforming gain of an enhanced Kronecker-product codebook.

As shown in FIG. 10, it will be understood that overall feedback overhead for Kronecker-product mono codebooks proposed in an embodiment of the present disclosure is less than overall feedback overhead for a general Kronecker-product codebook and overall feedback overhead for an enhanced Kronecker-product codebook.

Another example of a normalized beamforming gain for a Kronecker-product mono codebook in a case that an MISO scheme is used in a communication system according to an embodiment of the present disclosure has been described with reference to FIG. 10, and an example of a normalized beamforming gain according to the number of Rx antennas in a case that a MIMO scheme is used in a communication system according to an embodiment of the present disclosure will be described with reference to FIG. 11.

Figure 11:
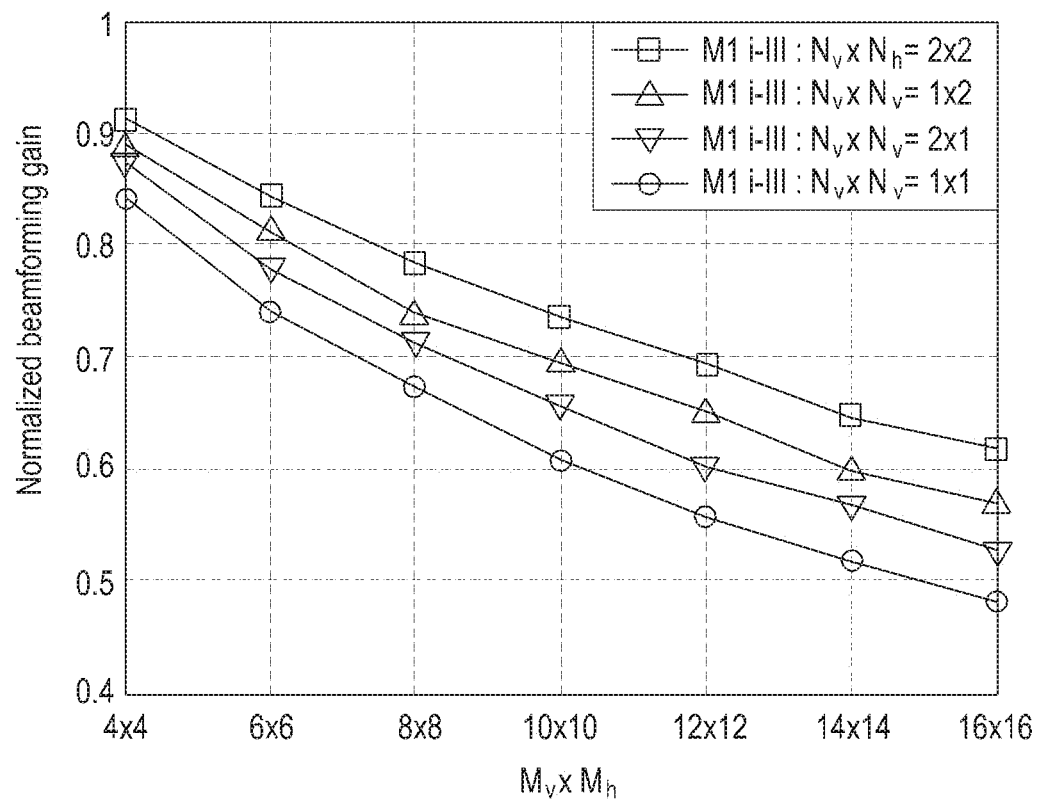
FIG. 11 schematically illustrates an example of a normalized beamforming gain according to the number of Rx antennas in a case that a MIMO scheme is used in a communication system according to an embodiment of the present disclosure.

FIG. 11 schematically illustrates an example of a normalized beamforming gain according to the number of Rx antennas in a case that a MIMO scheme is used in a communication system according to an embodiment of the present disclosure.

Referring to FIG. 11, a graph shown as "M-iii: $N_v \times N_h = 2 \times 2$" indicates a normalized beamforming gain in a case that two Rx antennas are used in a vertical area and two Rx antennas are used in a horizontal area, a graph shown as "M-iii: $N_v \times N_h = 1 \times 2$" indicates a normalized beamforming gain in a case that one Rx antenna is used in a vertical area and two Rx antennas are used in a horizontal area, a graph shown as "M-iii: $N_v \times N_h = 2 \times 1$" indicates a normalized beamforming gain in a case that two Rx antennas are used in a vertical area and one Rx antenna is used in a horizontal area, and a graph shown as "M-iii: $N_v \times N_h = 1 \times 1$" indicates a normalized beamforming gain in a case that one Rx antenna is used in a vertical area and one Rx antenna is used in a horizontal area.

Performance graphs in FIG. 11 indicate performance graphs in a case that $d_v = 0.8\lambda$ and $d_h = 0.5\lambda$, and a MIMO scheme is used in the communication system.

In FIG. 11, a vertical axis indicates a normalized beamforming gain, and a horizontal axis indicates the number of Tx antennas.

As shown in FIG. 11, it will be understood that the more increased, the number of Rx antennas is, the more increased, a normalized beamforming gain for the Rx antennas is, in a case that a MIMO scheme is used.

An example of a normalized beamforming gain according to the number of Rx antennas in a case that a MIMO scheme is used in a communication system according to an embodiment of the present disclosure has been described with reference to FIG. 11, and another example of a normalized beamforming gain according to the number of Rx antennas in a case that a MIMO scheme is used in a communication system according to an embodiment of the present disclosure will be described with reference to FIG. 12.

Figure 12:
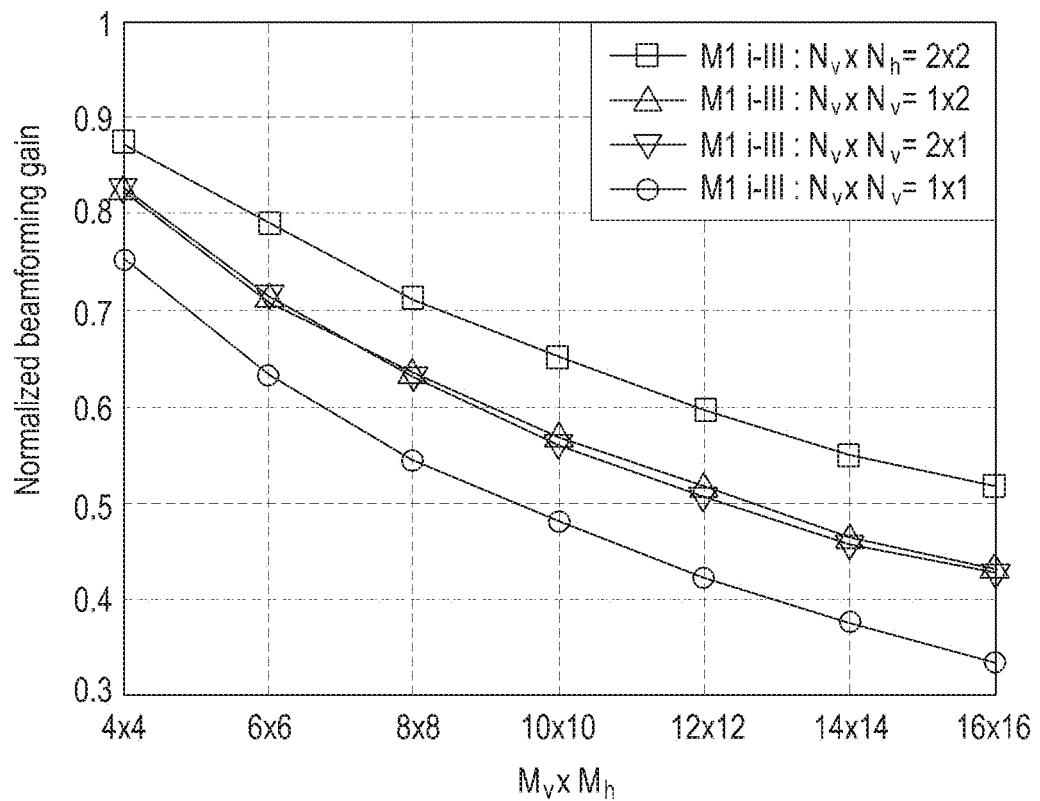
FIG. 12 schematically illustrates another example of a normalized beamforming gain according to the number of Rx antennas in a case that a MIMO scheme is used in a communication system according to an embodiment of the present disclosure.

FIG. 12 schematically illustrates another example of a normalized beamforming gain according to the number of Rx antennas in a case that a MIMO scheme is used in a communication system according to an embodiment of the present disclosure.

Referring to FIG. 12, a graph shown as "M-iii: $N_v \times N_h = 2 \times 2$" indicates a normalized beamforming gain in a case that two Rx antennas are used in a vertical area and two Rx antennas are used in a horizontal area, a graph shown as "M-iii: $N_v \times N_h = 1 \times 2$" indicates a normalized beamforming gain in a case that one Rx antenna is used in a vertical area and two Rx antennas are used in a horizontal area, a graph shown as "M-iii: $N_v \times N_h = 2 \times 1$" indicates a normalized beamforming gain in a case that two Rx antennas are used in a vertical area and one Rx antenna is used in a horizontal area, and a graph shown as "M-iii: $N_v \times N_h = 1 \times 1$" indicates a normalized beamforming gain in a case that one Rx antenna is used in a vertical area and one Rx antenna is used in a horizontal area.

Performance graphs in FIG. 12 indicate performance graphs in a case that $d_v = 1.6\lambda$ and $d_h = 1.0\lambda$, and a MIMO scheme is used in the communication system.

In FIG. 12, a vertical axis indicates a normalized beamforming gain, and a horizontal axis indicates the number of Tx antennas.

As shown in FIG. 12, it will be understood that the more increased, the number of Rx antennas is, the more increased, a normalized beamforming gain for the Rx antennas is, in a case that a MIMO scheme is used.

Performance for a beamforming operation which is based on a Kronecker-product dual codebook in a communication system supporting an FD-MIMO scheme according to an embodiment of the present disclosure will be described below.

In an embodiment of the present disclosure, a performance metric as expressed in Equation 31, i.e., a normalized beamforming gain is considered.

$$G \doteq E\left[\left|\frac{h[c]^H}{\|h[c]\|_2}\hat{c}\right|^2\right], c \in \{1, \cdots, C\} \quad \text{Equation 31}$$

In Equation 31, $h[c] \in \mathbb{C}^M$ denotes a MISO channel vector for the cth frequency tone, and $\hat{c} \in \mathbb{C}^M$ denotes a selected beamforming codeword vector which is designed for each narrow RB in a final codeword selecting process included in a beam searching process for a Kronecker-product dual codebook.

In an embodiment of the present disclosure, it will be noted that C (=600) channel tones are considered for simulations.

Feedback overhead schemes for Kronecker-product dual codebooks proposed in an embodiment of the present disclosure may be summarized as shown in Table 3.

TABLE 3

| Scheme | 1st round | 2nd round | Final | Feedback overhead |
|---|---|---|---|---|
| D-I | $B_{W1} = 5$, $B_{W2} = 5$ | $B_{N1} = 3$, ($B_{N2} = 2$, $B_{ph} = 2$) | $B_{sel} = 1$ | $B_{tot} = (2(B_{W1} + B_{W2}) + (2B_{N1} + B_{sel})R)L$ |
| D-II | | $B_{N1} = 2$, ($B_{N2} = 1$, $B_{ph} = 2$) | | |

As expressed in Table 3, it will be understood that a feedback overhead for a beam searching method for a Kronecker-product dual codebook is a combination of a feedback overhead for the first round-beam searching process for wide RBs included in the beam searching method for the Kronecker-product dual codebook, a feedback overhead for the second round-beam searching process for narrow RBs included in the beam searching method for the Kronecker-product dual codebook, and a feedback overhead for a final codeword selecting process included in the beam searching method for the Kronecker-product dual codebook.

Meanwhile, a simulation scheme for a beam searching method for a Kronecker-product mono codebook and a Kronecker-product dual codebook may be expressed as Table 4.

TABLE 4

| Scheme | Mono codebook | Scheme | Dual codebook |
|---|---|---|---|
| M1 | 1 PMI/600 tones | D1(LTE) | L = 1, R = 9, K = 72 |
| M2 | 1 PMI/75 tones | D2 | L = 3, R = 2, K = 100 |
| M3 | 1 PMI/30 tones | D3 | L = 4, R = 2, K = 75 |

In Table 4, it will be noted that first eight narrow RBs include 72 tones and the ninth narrow RB includes 24 tones in a case that a D1(LTE) scheme is used.

An example of a normalized beamforming gain for a Kronecker-product mono codebook and a normalized beamforming gain for a Kronecker-product dual codebook in a communication system according to an embodiment of the present disclosure will be described with reference to FIG. 13.

Figure 13:
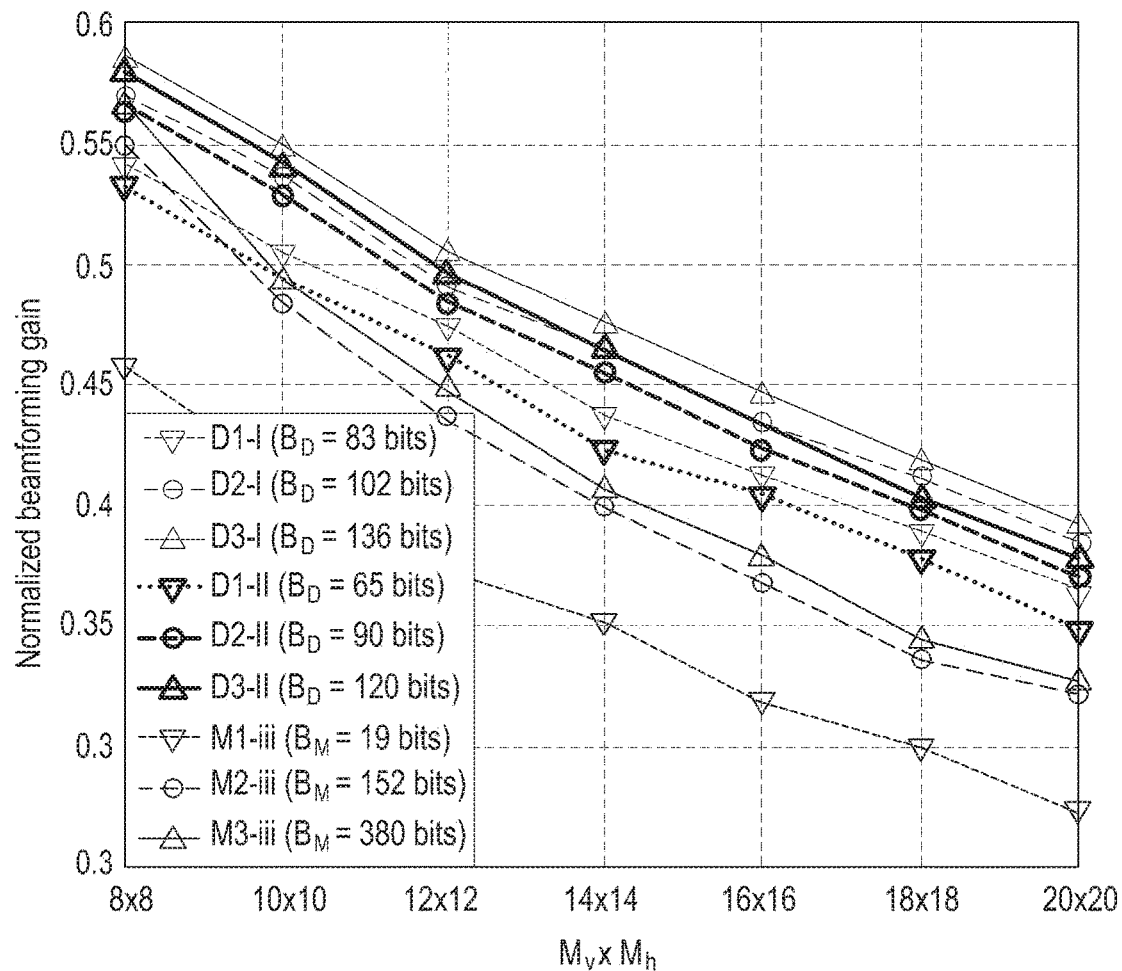
FIG. 13 schematically illustrates an example of a normalized beamforming gain for a Kronecker-product mono codebook and a normalized beamforming gain for a Kronecker-product dual codebook in a communication system according to an embodiment of the present disclosure.

FIG. 13 schematically illustrates an example of a normalized beamforming gain for a Kronecker-product mono codebook and a normalized beamforming gain for a Kronecker-product dual codebook in a communication system according to an embodiment of the present disclosure.

Referring to FIG. 13, each of graphs shown as "D1-I: $B_D$=83 bits", "D2-I: $B_D$=102 bits", "D3-I: $B_D$=136 bits", "D1-II: $B_D$=65 bits", "D2-II: $B_D$=90 bits", and "D3-II: $B_D$=120 bits" indicates a normalized beamforming gain of a Kronecker-product dual codebook proposed in an embodiment of the present disclosure, and each of graphs shown as "M1-iii: $B_M$=19 bits", "M2-iii: $B_M$=152 bits", and "M3-iii: $B_M$=380 bits" indicates a normalized beamforming gain of a Kronecker-product mono codebook proposed in an embodiment of the present disclosure.

Performance graphs in FIG. 13 indicate performance graphs in a case that $d_v$=0.82 and $d_h$=0.5λ in the communication system.

In FIG. 13, a vertical axis indicates a normalized beamforming gain, and a horizontal axis indicates the number of Tx antennas.

As shown in FIG. 13, it will be understood that normalized beamforming gains of Kronecker-product dual codebooks proposed in an embodiment of the present disclosure are better than normalized beamforming gains of Kronecker-product mono codebooks proposed in an embodiment of the present disclosure.

Further, it will be understood that Kronecker-product mono codebooks proposed in an embodiment of the present disclosure may decrease overall feedback overhead by sharing a wide band PMI among narrow RBs.

An example of a normalized beamforming gain for a Kronecker-product mono codebook and a normalized beamforming gain for a Kronecker-product dual codebook in a communication system according to an embodiment of the present disclosure has been described with reference to FIG. 13, and another example of a normalized beamforming gain for a Kronecker-product mono codebook and a normalized beamforming gain for a Kronecker-product dual codebook in a communication system according to an embodiment of the present disclosure will be described with reference to FIG. 14.

Figure 14:
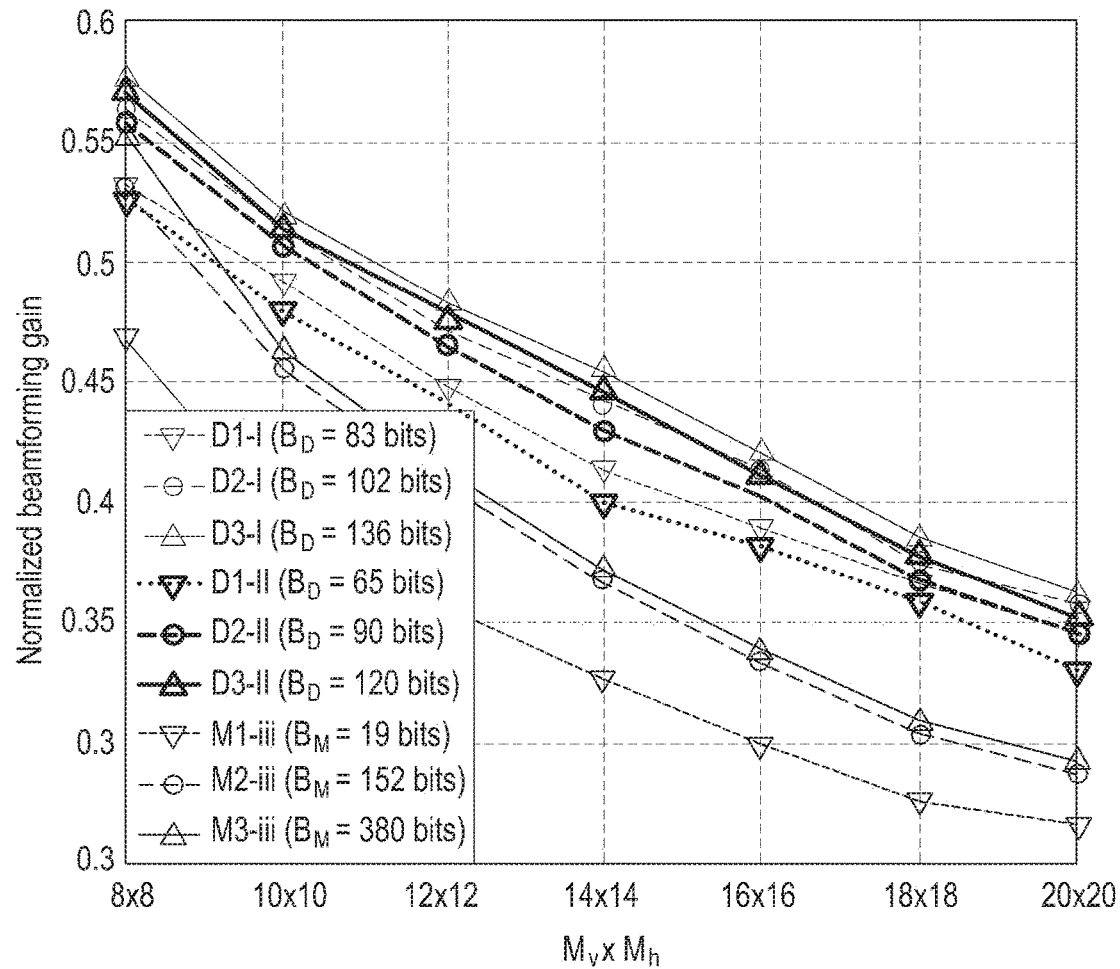
FIG. 14 schematically illustrates another example of a normalized beamforming gain for a Kronecker-product mono codebook and a normalized beamforming gain for a Kronecker-product dual codebook in a communication system according to an embodiment of the present disclosure.

FIG. 14 schematically illustrates another example of a normalized beamforming gain for a Kronecker-product mono codebook and a normalized beamforming gain for a Kronecker-product dual codebook in a communication system according to an embodiment of the present disclosure.

Referring to FIG. 14, each of graphs shown as "D1-I: $B_D$=83 bits", "D2-I: $B_D$=102 bits", "D3-I: $B_D$=136 bits", "D1-II: $B_D$=65 bits", "D2-II: $B_D$=90 bits", and "D3-II: $B_D$=120 bits" indicates a normalized beamforming gain of a Kronecker-product dual codebook proposed in an embodiment of the present disclosure, and each of graphs shown as "M1:iii $B_M$=19 bits", "M2-iii: $B_M$=152 bits", and "M3-iii: $B_M$=380 bits" indicates a normalized beamforming gain of a Kronecker-product mono codebook proposed in an embodiment of the present disclosure.

Performance graphs in FIG. 14 indicate performance graphs in a case that $d_v$=1.6λ and $d_h$=1.0λ in the communication system.

In FIG. 14, a vertical axis indicates a normalized beamforming gain, and a horizontal axis indicates the number of Tx antennas.

As shown in FIG. 14, it will be understood that normalized beamforming gains of Kronecker-product dual codebooks proposed in an embodiment of the present disclosure are better than normalized beamforming gains of Kronecker-product mono codebooks proposed in an embodiment of the present disclosure.

Further, it will be understood that Kronecker-product mono codebooks proposed in an embodiment of the present disclosure may decrease overall feedback overhead by sharing a wide band PMI among narrow RBs.

Another example of a normalized beamforming gain for a Kronecker-product mono codebook and a normalized beamforming gain for a Kronecker-product dual codebook in a communication system according to an embodiment of the present disclosure has been described with reference to FIG. 14, and an inner structure of a signal transmitting apparatus in a communication system supporting an FD-MIMO scheme according to an embodiment of the present disclosure will be described with reference to FIG. 15.

Figure 15:
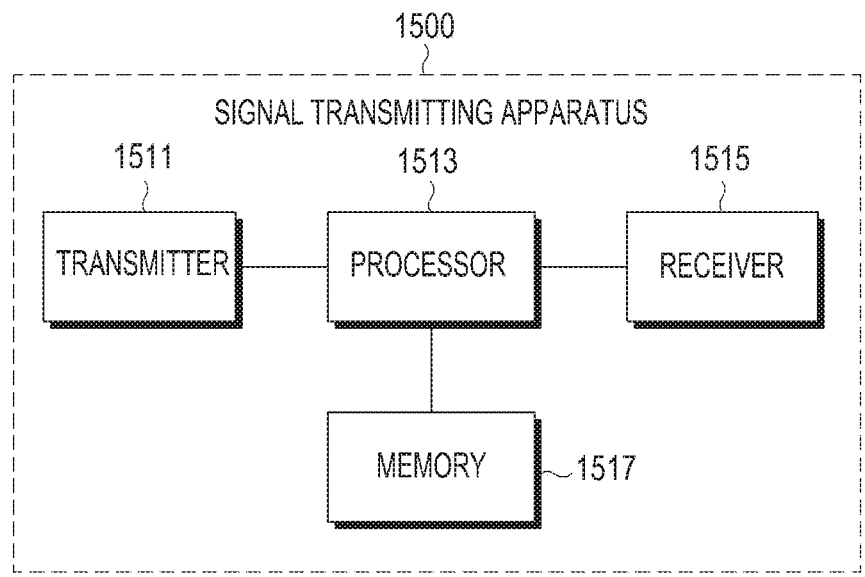
FIG. 15 schematically illustrates an inner structure of a signal transmitting apparatus in a communication system supporting an FD-MIMO scheme according to an embodiment of the present disclosure.

FIG. 15 schematically illustrates an inner structure of a signal transmitting apparatus in a communication system supporting an FD-MIMO scheme according to an embodiment of the present disclosure.

Referring to FIG. 15, a signal transmitting apparatus 1500 may be, for example, a UE or an eNB.

The signal transmitting apparatus 1500 includes a transmitter 1511, a processor 1513, a receiver 1515, and a memory 1517.

The processor 1513 controls the overall operation of the signal transmitting apparatus 1500. More particularly, the processor 1513 controls an operation related to an operation of performing a beamforming operation in a communication system supporting an FD-MIMO scheme according to an embodiment of the present disclosure, e.g., an operation of performing a beamforming operation based on a Kronecker-product mono codebook and a Kronecker-product dual codebook in the communication system supporting the FD-MIMO scheme according to an embodiment of the present disclosure. The operation of performing the beamforming operation in the communication system supporting the FD-MIMO scheme according to an embodiment of the present disclosure, e.g., the operation of performing the beamforming operation based on the Kronecker-product mono codebook and the Kronecker-product dual codebook in the communication system supporting the FD-MIMO scheme according to an embodiment of the present disclosure has been described with FIGS. 2 to 14, and a detailed description thereof will be omitted herein.

The transmitter 1511 transmits various signals and various messages to other entities, e.g., a signal receiving apparatus, and/or the like under a control of the processor 1513. The various signals and various messages transmitted in the transmitter 1511 have been described with reference to FIGS. 2 to 14, and a detailed description thereof will be omitted herein.

The receiver 1515 receives various signals and various messages from the other entities under a control of the processor 1513. The various signals and various messages received in the receiver 1515 have been described with reference to FIGS. 2 to 14, and a detailed description thereof will be omitted herein.

The memory 1517 stores various programs, various data, and/or the like related to an operation related to an operation of performing a beamforming operation in a communication system supporting an FD-MIMO scheme according to an embodiment of the present disclosure, e.g., an operation of performing a beamforming operation based on a Kronecker-product mono codebook and a Kronecker-product dual codebook in the communication system supporting the FD-MIMO scheme according to an embodiment of the present disclosure, performed in the signal transmitting apparatus 1500 under a control of the processor 1513.

The memory 1517 stores various signals and various messages which are received by the receiver 1515 from the other entities.

While the transmitter 1511, the processor 1513, the receiver 1515, and the memory 1517 are described in the signal transmitting apparatus 1500 as separate devices, it is to be understood that this is merely for convenience of description. In other words, two or more of the transmitter 1511, the processor 1513, the receiver 1515, and the memory 1517 may be incorporated into a single device.

The signal transmitting apparatus 1500 may be implemented with one processor.

An inner structure of a signal transmitting apparatus in a communication system supporting an FD-MIMO scheme according to an embodiment of the present disclosure has been described with reference to FIG. 15, and an inner structure of a signal receiving apparatus in a communication system supporting an FD-MIMO scheme according to an embodiment of the present disclosure will be described with reference to FIG. 16.

Figure 16:
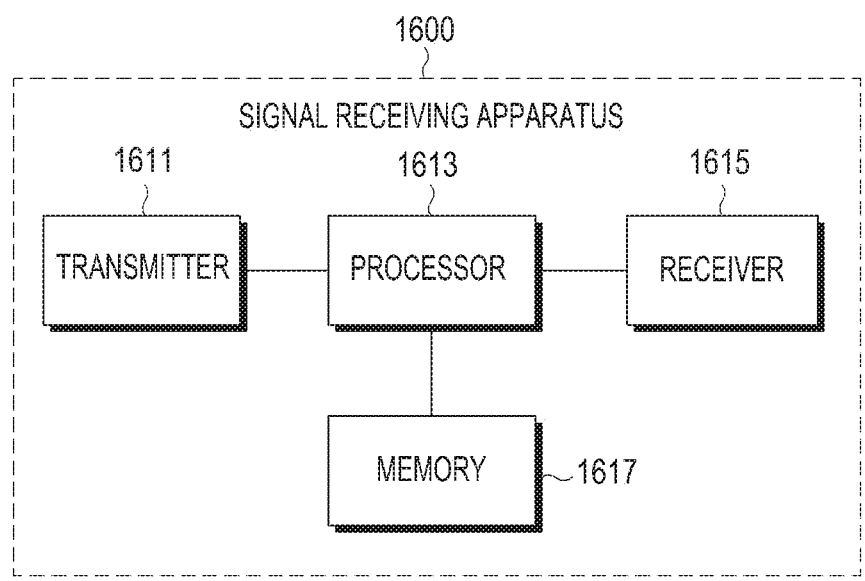
FIG. 16 schematically illustrates an inner structure of a signal receiving apparatus in a communication system supporting an FD-MIMO scheme according to an embodiment of the present disclosure.

FIG. 16 schematically illustrates an inner structure of a signal receiving apparatus in a communication system supporting an FD-MIMO scheme according to an embodiment of the present disclosure.

Referring to FIG. 16, a signal receiving apparatus 1600 may be, for example, a UE or an eNB.

The signal receiving apparatus 1600 includes a transmitter 1611, a processor 1613, a receiver 1615, and a memory 1617.

The processor 1613 controls the overall operation of the signal receiving apparatus 1600. More particularly, the processor 1613 controls an operation related to an operation of performing a beamforming operation in a communication system supporting an FD-MIMO scheme according to an embodiment of the present disclosure, e.g., an operation of performing a beamforming operation based on a Kronecker-product mono codebook and a Kronecker-product dual codebook in the communication system supporting the FD-MIMO scheme according to an embodiment of the present disclosure. The operation of performing the beamforming operation in the communication system supporting the FD-MIMO scheme according to an embodiment of the present disclosure, e.g., the operation of performing the beamforming operation based on the Kronecker-product mono codebook and the Kronecker-product dual codebook in the communication system supporting the FD-MIMO scheme according to an embodiment of the present disclosure has been described with FIGS. 2 to 14, and a detailed description thereof will be omitted herein.

The transmitter 1611 transmits various signals and various messages to other entities, e.g., a signal transmitting apparatus, and/or the like under a control of the processor 1613. The various signals and various messages transmitted in the transmitter 1611 have been described with reference to FIGS. 2 to 14, and a detailed description thereof will be omitted herein.

The receiver 1615 receives various signals and various messages from the other entities under a control of the processor 1613. The various signals and various messages received in the receiver 1615 have been described with reference to FIGS. 2 to 14, and a detailed description thereof will be omitted herein.

The memory 1617 stores various programs, various data, and/or the like related to an operation related to an operation of performing a beamforming operation in a communication system supporting an FD-MIMO scheme according to an embodiment of the present disclosure, e.g., an operation of performing a beamforming operation based on a Kronecker-product mono codebook and a Kronecker-product dual codebook in the communication system supporting the FD-MIMO scheme according to an embodiment of the present disclosure, performed in the signal receiving apparatus 1600 under a control of the processor 1613.

The memory 1617 stores various signals and various messages which are received by the receiver 1615 from the other entities.

While the transmitter 1611, the processor 1613, the receiver 1615, and the memory 1617 are described in the signal receiving apparatus 1600 as separate devices, it is to be understood that this is merely for convenience of description. In other words, two or more of the transmitter 1611, the processor 1613, the receiver 1615, and the memory 1617 may be incorporated into a single device.

The signal receiving apparatus 1600 may be implemented with one processor.

As is apparent from the foregoing description, an embodiment of the present disclosure enables to perform a beamforming operation in a communication system supporting an FD-MIMO scheme.

An embodiment of the present disclosure enables to perform a beamforming operation based on a Kronecker-product mono codebook and a Kronecker-product dual codebook in a communication system supporting an FD-MIMO scheme.

An embodiment of the present disclosure enables to perform a beamforming operation based on a channel characteristic in a communication system supporting an FD-MIMO scheme.

An embodiment of the present disclosure enables to perform a beamforming operation based on an antenna structure in a communication system supporting an FD-MIMO scheme.

An embodiment of the present disclosure enables to perform a beamforming operation thereby decreasing feedback overhead in a communication system supporting an FD-MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROM (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RANI, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a processor and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication device for performing a wired or a wireless communication with a graphic processing device, and a processor for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a beamforming operation in a communication system supporting a frequency division-multiple input multiple output (FD-MIMO) scheme, the method comprising:
    detecting a rough beam of a first dominant beam;
    detecting at least two codeword candidates based on the rough beam of the first dominant beam; and
    selecting one of the at least two codeword candidates as a final codeword.

2. The method of claim 1, wherein the detecting of the at least two codeword candidates based on the rough beam of the first dominant beam comprises:
    detecting a first codeword candidate of the at least two codeword candidates by considering a scenario assuming one dominant beam in a channel; and
    detecting a second codeword candidate of the at least two codeword candidates by considering a scenario assuming two dominant beams in a channel.

3. The method of claim 2, wherein the detecting of the second codeword candidate of the at least two codeword candidates by considering the scenario assuming the two dominant beams in the channel comprises:
    detecting a second dominant beam and jointly combining the second dominant beam and a first dominant beam which corresponds to the first codeword candidate to detect the second codeword candidate.

4. The method of claim 1, wherein the detecting of the rough beam of the first dominant beam comprises:
    detecting a Kronecker-product of discrete Fourier transform (DFT) vectors as the rough beam of the first dominant beam.

5. A method for performing a beamforming operation in a communication system supporting a frequency division-multiple input multiple output (FD-MIMO) scheme, the method comprising:
    detecting at least two beams for each of at least two wide resource blocks (RBs);
    detecting at least two codeword candidates for each of narrow RBs based on the detected at least two beams; and
    selecting one of the at least two codeword candidates as a final codeword.

6. The method of claim 5, wherein the detecting of the at least two beams for each of the at least two wide RBs comprises:
    detecting a first dominant beam and a second dominant beam for each of the at least two wide RBs.

7. The method of claim 6,
    wherein a wide band including a plurality of tones includes the at least two wide RBs, and
    wherein each of the at least two wide RBs includes at least two narrow RBs.

8. The method of claim 7,
    wherein each of the at least two wide RBs has a wide band precoding matrix indicator (PMI), and
    wherein the each of the at least two narrow RBs has a narrow band PMI.

9. The method of claim 5, wherein the detecting of the at least two codeword candidates for each of the narrow RBs based on the detected at least two beams comprises:
    detecting a first codeword candidate of the at least two codeword candidates by considering a scenario assuming one dominant beam in a channel; and
    detecting a second codeword candidate of the at least two codeword candidates by considering a scenario assuming two dominant beams in a channel.

10. The method of claim 9, wherein the detecting of the second codeword candidate of the at least two codeword candidates by considering the scenario assuming the two dominant beams in the channel comprises:
    detecting a second dominant beam and jointly combining the second dominant beam and a first dominant beam which corresponds to the first codeword candidate to detect the second codeword candidate.

11. An apparatus for performing a beamforming operation in a communication system supporting a frequency division-multiple input multiple output (FD-MIMO) scheme, the apparatus comprising:
    a memory; and
    a processor coupled to the memory configured to perform:
        an operation of detecting a rough beam of a first dominant beam, an operation of detecting at least two codeword candidates based on the rough beam of the first dominant beam, and an operation of selecting one of the at least two codeword candidates as a final codeword.

12. The apparatus of claim 11, wherein the operation of detecting the at least two codeword candidates based on the rough beam of the first dominant beam comprises:

an operation of detecting a first codeword candidate of the at least two codeword candidates by considering a scenario assuming one dominant beam in a channel; and an operation of detecting a second codeword candidate of the at least two codeword candidates by considering a scenario assuming two dominant beams in a channel.

13. The apparatus of claim 12, wherein the operation of detecting the second codeword candidate of the at least two codeword candidates by considering the scenario assuming the two dominant beams in the channel comprises:

an operation of detecting a second dominant beam and jointly combining the second dominant beam and a first dominant beam which corresponds to the first codeword candidate to detect the second codeword candidate.

14. The apparatus of claim 11, wherein the operation of detecting the rough beam of the first dominant beam comprises:

an operation of detecting a Kronecker-product of discrete Fourier transform (DFT) vectors as the rough beam of the first dominant beam.

15. An apparatus for performing a beamforming operation in a communication system supporting a frequency division-multiple input multiple output (FD-MIMO) scheme, the apparatus comprising:

a memory; and a processor coupled to the memory configured to perform:

an operation of detecting at least two beams for each of at least two wide resource blocks (RBs), an operation of detecting at least two codeword candidates for each of narrow RBs based on the detected at least two beams, and an operation of selecting one of the at least two codeword candidates as a final codeword.

16. The apparatus of claim 15, wherein the operation of detecting the at least two beams for each of the at least two wide RBs comprises:

an operation of detecting a first dominant beam and a second dominant beam for each of the at least two wide RBs.

17. The apparatus of claim 16, wherein a wide band indicating a plurality of tones includes the at least two wide RBs, and wherein each of the at least two wide RBs includes at least two narrow RBs.

18. The apparatus of claim 17, wherein each of the at least two wide RBs has a wide band precoding matrix indicator (PMI), and wherein the each of the at least two narrow RBs has a narrow band PMI.

19. The apparatus of claim 15, wherein the operation of detecting the at least two codeword candidates for each of the narrow RBs based on the detected at least two beams comprises:

an operation of detecting a first codeword candidate of the at least two codeword candidates by considering a scenario assuming one dominant beam in a channel; and an operation of detecting a second codeword candidate of the at least two codeword candidates by considering a scenario assuming two dominant beams in a channel.

20. The apparatus of claim 19, wherein the operation of detecting the second codeword candidate of the at least two codeword candidates by considering the scenario assuming the two dominant beams in the channel comprises:

an operation of detecting a second dominant beam and jointly combining the second dominant beam and a first dominant beam which corresponds to the first codeword candidate to detect the second codeword candidate.

* * * * *